US00RE40414E

(19) United States
(12) Reissued Patent
Takahashi et al.

(10) Patent Number: US RE40,414 E
(45) Date of Reissued Patent: *Jul. 1, 2008

(54) OPTICAL PICKUP APPARATUS

(75) Inventors: Yoshitaka Takahashi, Yokohama (JP); Hiroshi Akiyama, Yokohama (JP); Masami Emoto, Yokohama (JP)

(73) Assignee: Ricoh Company, Ltd., Tokyo (JP)

( * ) Notice: This patent is subject to a terminal disclaimer.

(21) Appl. No.: 09/577,006

(22) Filed: May 22, 2000

Related U.S. Patent Documents

Reissue of:
(64) Patent No.: 5,870,370
Issued: Feb. 9, 1999
Appl. No.: 08/895,511
Filed: Jul. 16, 1997

U.S. Applications:
(63) Continuation of application No. 08/311,050, filed on Sep. 23, 1994, now Pat. No. 5,694,385.

(30) Foreign Application Priority Data

Sep. 24, 1993 (JP) ..... 5237027
Sep. 30, 1993 (JP) ..... 5245295
Oct. 28, 1993 (JP) ..... 5270225

(51) Int. Cl.
*G11B 7/00* (2006.01)

(52) U.S. Cl. ..... 369/112.02; 369/44.12; 369/44.23; 369/112.28; 369/120

(58) Field of Classification Search ..... 369/44.23, 369/44.37, 112.02, 112.27, 112.26, 112.28, 369/120, 110, 112, 124, 103, 109, 44.32, 369/44.39, 44.33, 112.17, 44.12, 44.38, 44.42, 369/122, 112.1, 112.03; 359/19; 250/225
See application file for complete search history.

(56) References Cited

U.S. PATENT DOCUMENTS 3,900,247 A * 8/1975 Zaky ..... 359/247
4,125,860 A * 11/1978 Ishii et al. ..... 369/112.21
4,569,039 A * 2/1986 Okumura et al. ..... 369/112
4,624,526 A * 11/1986 Tsukai et al. ..... 369/112.1

(Continued)

FOREIGN PATENT DOCUMENTS

JP 56-061043 * 5/1981
JP 4-087041 * 3/1992
JP 4-155629 * 5/1992
JP 5-120755 * 5/1993

*Primary Examiner*—Hoa T. Nguyen
*Assistant Examiner*—Kim-Kwok Chu
(74) *Attorney, Agent, or Firm*—Cooper & Dunham, LLP

(57) ABSTRACT

Small-sized and light-weighted optical pickup apparatus capable of eliminating the effect due to the flaring light rays and performing the signal detection of high reliability is provided.

In the apparatus, the quarter-wave (λ/4) plate and the reflection-type birefringent prime provided with the deflecting function of deflecting the reflection light rays reflected on the optical information recording medium and the light rays flux separating function of separating the reflected light rays from the outgoing light rays are disposed in the optical path between the semiconductor laser constructing the optical pickup portion and the objective lens, and the light-receiving element for receiving the reflection light rays from the optical information recording medium which are defleced and separated by the reflection-type birefringent prism is disposed on a single (same) substrate together with the semiconductor laser.

11 Claims, 35 Drawing Sheets

U.S. PATENT DOCUMENTS 4,626,679 A * 12/1986 Kuwayama et al. ..... 369/44.12
4,771,414 A * 9/1988 Yoshimatsu ..... 369/112
4,804,835 A * 2/1989 Ando ..... 369/112.28
5,050,155 A * 9/1991 Kurata et al. ..... 369/112
5,056,080 A * 10/1991 Russell ..... 369/112
5,062,096 A * 10/1991 Takagi ..... 369/44.38
5,132,950 A * 7/1992 Sato et al. ..... 369/44.14
5,136,152 A * 8/1992 Lee ..... 369/112.28
5,172,368 A * 12/1992 Lehureau ..... 369/112
5,210,627 A * 5/1993 Toide et al. ..... 369/110
5,251,058 A * 10/1993 MacArthur ..... 359/250
5,251,198 A * 10/1993 Strickler ..... 369/112
5,293,371 A * 3/1994 Koyama ..... 369/110.04
5,331,621 A * 7/1994 Miyake et al. ..... 369/112
5,410,529 A * 4/1995 Kurata et al. ..... 369/116
5,631,774 A * 5/1997 Yoshizawa ..... 369/110

* cited by examiner

WHEN $n_e < n_o$

WHEN $n_e < n_o$

WHEN $n_o < n_e$

WHEN $n_o < n_e$ (MAGNETIZING DIRECTION OF DISK : ↑)

(MAGNETIZING DIRECTION OF DISK : ↓)

(MAGNETIZING DIRECTION OF DISK : ↑)

(MAGNETIZING DIRECTION OF DISK : ↓)

(MAGNETIZING DIRECTION OF DISK : ↑)

(MAGNETIZING DIRECTION OF DISK : ↓)

P-POLARIZED LIGHT RAYS :

OSCILLATION SURFACE THEREOF COINCIDES WITH THE SURFACE MADE BY THE OUTGOING LIGHT RAYS AND THE NORMAL LINE OF THE SURFACE A OF THE PRISM

S-POLARIZED LIGHT RAYS :

OSCILLATION SURFACE THEREOF IS PERPENDICULAR TO THAT OF THE P-POLARIZED LIGHT RAYS

WOLLASTON PRISM AND ROCHON PRISM

TECHNICAL THOUGHT OF THE PHASE-DIFFERENCE PLATE (QURTER-WAVE [λ/4] PLATE)

MANUFACTURING OF PHASE DIFFERENCE PLATE

OPTICAL PICKUP APPARATUS

Matter enclosed in heavy brackets [ ] appears in the original patent but forms no part of this reissue specification; matter printed in italics indicates the additions made by reissue.

This is a continuation of application Ser. No. 08/311,050 filed Sep. 23, 1994 now U.S. Pat. No. 5,694,385.

BACKGROUND OF THE INVENTION

1. Field of the Invention

The present invention relates to optical pickup apparatuses employed for the optical disk drive, in particular, an optical pickup apparatus capable of constructing an optical systems nearly identifying the optical path of illuminating light rays and the other optical path of detecting light rays by use of a light rays flux separating element consisting of birefringent (complex refraction) crystal, another optical pickup apparatus which is small-sized and has a small number of employed parts, and still another optical pickup apparatus executing information record and reproduction and further executing focus servo and tracking servo.

2. Description of the Related Art

Concerning the documents respectively describing the technologies in relation to the first group of the present invention, there exist some documents as listed up below:

1) Japanese Laid-open Patent Publication No. 56-61043/1981 "A FOCUS DETECTING APPARATUS", 2) Japanese Laid-open Patent Publication No. 4-87041/1992 "AN OPTICAL DETECTOR", and 3) Japanese Laid-open Patent publication No. 5-120755/1993, "AN OPTICAL HEAD".

The above-listed document 1) relates to a focus detecting apparatus and describes that, in an information reading-out apparatus which focuses the light rays spot through the objective lens onto the information track of the recording medium having the information recorded thereon spirally or in a state of concentric circles and reads out the information therefrom, the above-mentioned focus detecting apparatus detects whether the light rays spot is correctly focused by the objective lens onto the recording medium.

The document further describes that a prism made of a birefringent material such as Rochon prism is disposed between the coupling lens (CL) and the objective lens, there reflection light rays reflected on the disk are separated from the incident light rays, the light rays flux thus separated causes an astigmatism in order to obliquely enter the coupling lens as the incident light rays, and thereby the focus detection is performed.

And further, the other above-listed document 2) describes that, in order to simplify the construction of the optical pickup apparatus for reading out the information signal written in the magneto-optic disk and in order to facilitate the assembling and manufacturing processes thereof, an inclined uniaxial crystal plate is mounted on the supporter of the light-receiving element, and thus a detection system for detecting the magneto-optic signal, the focus signal and the track signal is constructed, for the purpose of simplifying the detection system.

Furthermore, the still other above-listed document 3) describes the optical pickup apparatus in which, in order to enable to detect the focus error signal always with high precision and in order to detect the magneto-optic signal at the same time, the semiconductor laser (LD) employing hologram and the light detector (PD) are unitarily constructed.

FIG. 11 is a configuration diagram showing the construction of the first example of the conventional optical pickup device.

In FIG. 11, the reference numeral 21 represents a semiconductor laser (LD), 22 a coupling lens (CL), 23 a polarized light beam splitter (PBS), 24 a deflecting mirror, 25 a quarter-wave (λ/4) plate, 26 an objective lens, 27 a recording medium, 28 a detecting lens (DL), 29 a cylinder lens, 30 a four-divisional light receiving element (PD), and 31 a detection system.

The linearly-polarized divergent light rays emitted from the semiconductor laser (LD) 21 are converted to the parallel light rays by the coupling lens 22, pass through the polarized light beam splitter (PBS) 23, and are deflected by the deflecting mirror 24.

The deflected light rays are further converted to the circularly-polarized light rays by the quarter-wave (λ/4) plate 25 and focused on the recording surface of the light recording medium 27 by the objective lens 26. The light rays flux reflected on the recording surface is made again parallel by the objective lens 26 and further converted to the linearly-polarized light rays in which the polarizing surface thereof is relatively rotated by 90° to the incident light rays. The light rays thus converted pass through the deflecting mirror 24, and the same are reflected on the PBS 23 and guided to the detection system 31. The light rays flux guided to the detection system 31 passes through the detecting lends 28 and the cylinder lens 29, and is detected by the four-divisional light-receiving element 30. On this occasion, the focus error signal is obtained by the astigmatism, the track error signal is obtained by the push-pull method, and the Rf signal is obtained by the variation of the four-divisional summed light amount (light intensity), that is, the difference of the reflection rate from the disk.

Conventionally, as mentioned heretofore, there exists some extent of limitation in small-sizing the optical system, in order to completely separating the optical path of the illuminating light rays and that of the detecting light rays by use of the PBS (polarized light beam splitter).

And further, although it has been already proposed to separate the light rays flux by utilizing the hologram, there existed some problems to be solved in the efficiency of utilizing the light rays.

Concerning the documents respectively describing the prior-art technologies in relation to the second group of the present invention, there exist some documents as listed up below;

1) Japanese Laid-open Patent Publication No. 4-87041/1992 "Light Detector",

2) Japanese Laid-open Patent Publication No. 4-155629/1992 "Optical Pickup"

and

3) "Hologram Pickup for use in Laser Disk" (Edited by Sachio Kurata and other seven members, SHARP Technical Report Vol. 48, March 1991, P. 21–26).

The above-listed document 1) describes that a uniaxial crystal board is mounted on the supporter for supporting a light detecting element having plural light-receiving surfaces so as to slantedly oppose to the respective light-receiving surfaces of the above light detecting element, and thereby the construction of the optical pickup device can be simplified, namely, the light-receiving element and the light detecting optical element is unitarily combined into one.

Furthermore, the above-listed document 2) describes that the optical pickup comprises a lens member having the light-emitting element and the light-receiving element both hermetically enclosed (sealed) therein and further having a lens surface formed on one end thereof for focusing the outgoing light rays emitted from the light emitting element, and biaxial driving means for positioning the above-mentioned lens member in both of the focus direction and the radius direction of the optical disk, and further, a hologram for guiding a part of the outgoing light rays of the light-emitting element reflected on the optical disk toward the light receiving element is formed on the lens surface of the afore-mentioned lens member, so that an optical pickup can be constructed with small number of employed parts and the reproduced signal does not vary due to the time-elapsing variation by stabilizing the positional relationship between the light-emitting element and the light-receiving element. Namely, in the document 2), the light rays flux is separated into two, one for the semiconductor laser and another one for the light-receiving element by use of the hologram, and the semiconductor laser and the light-receiving element are unitarily combined into one.

Furthermore, the above-listed document 3) describes a hologram pickup, in which plural functions for use in CD are integrated in one hologram element, and a laser diode employed as a light source and a photo diode for detecting the signal are disposed in one package.

FIG. 16 is a construction diagram for illustrating the construction of the second example of the conventional optical pickup (PU) device. In FIG. 16, the reference numeral 131 represents a laser (LD), 132 a collimating lens (CL), 133 a beam shaping prism, 134 a beam splitter, 135 a deflecting prism, 136 a quarter-wave (λ/4) plate, 137 an objective lens, 138 an optical information recording medium, 139 a detection lens, 140 a knife-edge prism, 141 a light-receiving element for detecting the track, and 142 a light-receiving element for detecting the focus.

The light rays flux emitted from the semiconductor laser 131 is converted to parallel light rays by use of the collimating lens 132 and the beam of the light rays is enlarged by the beam shaping prism 133. In such manner, a preferable spot can be obtained on an optical information recording medium 138 mentioned later.

Thereafter, the light rays flux is radiated as an extremely small spot of almost 1 μm onto the optical information recording medium 138 after passing through the beam splitter 134, the deflecting prism 135, the quarter-wave plate (λ/4 plate) 136, and the objective lens 137. In such manner, the information is recorded and reproduced. The reflection right rays reflected on the optical information recording medium 138 pass through the objective lens 137, the quarter-wave plate (λ/4 plate) 136 and the deflecting prism 135, and the same are reflected on the beam splitter 134 and directed toward the detection system which comprises the detection lens 139, the knife-edge prism 140, the light receiving element 141 for detecting the track, and the light-receiving element 142 for detecting the focus.

FIG. 17a through 17c are diagrams showing the light-receiving element 142 for detecting the focus in FIG. 16. FIG. 17a shows the state in which the beam is located just at the center position between A and B, namely, the optimum state. FIG. 17b shows the state in which the beam is located at the B area, namely, the distant state.

FIG. 17c shows the state in which the beam is located at the A area, namely, the near state. As shown in FIGS. 17a through 17c, the focus detecting light-receiving element 142 is divided into two, A and B.

The amount and direction of the focus deviation is detected from the light intensity (amount) difference A−B of the light rays received by A and B, and the objective lens 137 is controlled in the direction of the arrow F shown in FIG. 16 such that the focus deviation becomes always not larger than 1 μm.

FIG. 18 shows a view showing a track detecting light-receiving element 141 in FIG. 16. As shown in FIG. 18, the track detecting light-receiving element 141 is divided into two, C and D. The spot focused by the objective lens 137 detects the amount and direction of the focus deviation from the light intensity (amount) difference C−D of the reflection light rays diffracted by a guide groove 143, and the objective lens 137 is controlled in the direction of the arrow T shown in FIG. 16 such that the track deviation becomes always not larger than 1 μm.

FIG. 19 is a view showing another example of the conventional optical pickup device (system) shown in FIG. 16. In FIG. 19, the reference numeral 144 represents an astigmatism generating element, and 145 a four-divisional light-receiving element. In the afore-mentioned FIG. 16, the knife-edge method is employed for detecting the focus. FIG. 19 shows an astigmatism method of employing the above-mentioned astigmatism generating element 144, and the four-divisional light-receiving element 145 is put on a circular position in which the light intensity distribution of the four-divisional elements; E, F, G, and H becomes almost uniform at the unfocused spot position. The track can be detected by the value: (E+G)−(F+H), in a similar way.

FIGS. 20a through 20c are diagrams showing the focusing state of the four-divisional light-receiving element in FIG. 19. FIG. 20a shows a proper (optimum) state. When the focus deviates, the spot of the light rays becomes elliptical as shown in FIGS. 20b and 20c. The amount and direction of the focus deviation can be judged by the shape of the elliptical spot. The track can be detected by the value: (E+F)−(G+H) as shown in FIG. 18.

The defect of the optical system in the conventional optical pickup device as mentioned before is that the number of the construction parts is large and the respective parts become large-sized. For this reason, the art shown in document 2); Japanese Laid-open Patent Publication No. 4-87041/1992, employs a hologram and combines unitarily the semiconductor laser (LD) and the light-receiving element into one for the purpose of realizing a small-sized optical pickup.

FIG. 21 is a construction diagram showing the construction of the third example of the optical pickup device described in the above-mentioned document 2), in which a hologram is employed, and the semiconductor laser and the light-receiving element are unitarily combined into one. In FIG. 21, the reference numeral 151 represents an objective lens, 152 a hologram plate, 153 a light-receiving element, 154 a laser diode (LD), 155 a light-receiving/emitting substrate, and 156 an optical disk.

The laser diode 154 and the light-receiving element 153 are mounted on the light-receiving/emitting substrate 155. The optical disk 156 and the optical pickup are in the positional relationship at the time of ordinary recording and reproducing. On this occasion, the outgoing light rays emitted from the laser diode 154 are focused on the recording/reproducing surface of the optical disk 156 by the hologram plate 152, and further, a part of the reflection light rays from the optical disk 156 is wave-surface-divided (diffracted) by the hologram of the hologram plate 152 and guided to the side of the light-receiving element 153. A part of the reflection light rays is focused on the central portion of the light-receiving element 153. On this occasion, a part of the light rays flux directed to the hologram plate 152 from the laser diode 154 is also wave-surface-divided by the hologram. However, since the wave-surface-divided light rays flux is reflected by the optical disk 156 in a direction opposite to that of the hologram plate 152, it does not exert any influence on the reproducing signal.

Nevertheless, the light utilizing efficiency is not so well. In general, the efficiency contributing to the spot is only a little less than 50% of the reflected light rays and the efficiency contributing to the detection system is only 10%–30% of the same. The above matter is a practical problem to be solved.

FIGS. 22a and 22b are perspective views respectively showing the construction of the fourth example of the conventional optical pickup device and the conventional hologram pickup device both described in the document 3); Japanese Laid-open Patent Publication No. 5-120755/1993. In FIGS. 22a and 22b, the reference numeral 161 represents a disk, 162 an objective lens, 163 a collimating lens, 164 a beam splitter, 165 a grating, 166 a cover lens, 167 a laser diode (LD), 168 a photodevice, 169 a hologram, and 170 a hologram optical element (HOE).

The hologram optical element (HOE) 170 is made of a sheet of glass substrate. The hologram 169 is formed on the upper surface thereof, and a diffraction grating for creating the tracking beam is formed on the lower surface thereof. A plan plate beam splitter of the optical pickup, a light branch of concave lens, and a pickup control signal creating function are integrated in the hologram. The laser diode (LD) 167 and the photo-diode (FD) 168 for detecting the signal are mounted on a common stem and accommodated in one package. The hologram optical element 170 is bonded on the upper surface of the package with adhesive agents and unitarily combined with LD 167 and PD 168. In such construction, the number of the employed parts for constructing the pickup is reduced from 7 to 3. The package for LD 167 and PD 168 is hermetically sealed. In such manner, the positional relationship between the mutual elements can be kept extremely stable.

Next, the other actual examples of the conventional optical pickup device are described hereinafter.

As to the other conventional pickups, there exist four examples as mentioned below in order. Firstly, the construction of the fifth example of the conventional pickup device is explained referring to FIG. 40. The outgoing light rays emitted from a semiconductor laser 201 are converted to parallel light rays by a collimating lens 202. Thereafter, the converted light rays pass through a beam splitter 203 and the optical path of the light rays is bent by a deflecting prism 204. And further, the light rays are focused by an objective lens 205 and form a extremely small spot on the surface of an optical disk 206 employed as the optical information recording medium. Thereby, the recording, etc. of the information is done. Furthermore, the reflection light rays reflected on the optical disk 206 go forward in the direction opposite to that of the incident optical path and are reflected by the beam splitter 203. Next, the reflected light rays are focused by a detection lens 208 in a signal detecting optical system 207 and guided to a light-receiving element 209. Thereafter, the data information recorded on the surface of the optical disk 206 is reproduced, or the tracking servo control and the focusing servo control of the objective lens 205 are performed by detecting the track error signal and the focus error signal, on the basis of the distribution of the light amount (light intensity) detected by the light-receiving element 209.

Secondly, the construction of the sixth example of the conventional pickup device is explained referring to FIG. 41. The difference between the first example and the second example is that, in the second example, a magneto-optic disk 210 is employed as the optical information recording medium, and the construction in the signal detecting optical system 207 is changed. The polarizing surface of the reflection light rays reflected on the surface of the magneto-optic disk 210 is rotated by 45° by use of the half-wave (λ/2) plate 211 of the signal detecting optical system 207, and the light rays thus rotated are focused by the detection lens 208 and enter a polarizing beam splitter 212 as incident light rays. At this time, the P-polarized light rays pass through the polarizing beam splitter 212 and are guided to a light-receiving element 213. On the other hand, the S-polarized light rays are reflected on the polarizing splitter 212 and guided to the light-receiving element 214. Thereby, the data information on the surface of the magneto-optic disk 210 can be obtained as the differential signal between the signal from the light-receiving element 213 and that from the other light-receiving element 214.

Next, the construction of the seventh example of the conventional pickup device is explained referring to the disclosure in the document, Japanese Laid-open Patent Publication No. 62-172538/1987, "Optical Head Apparatus", and FIG. 42. In the example, a diffraction grating 215 is employed as the optical path separating measure in order to separate the foregoing light rays 216 emitted from the semiconductor laser 201 and directed to the optical disk 206 and the reflection light rays 217 reflected on the optical disk 206, from each other. Thereafter, the diffraction light rays 218 diffracted by a diffraction grating 215 among the reflection light rays 217 reflected on the optical disk 206 are guided to the light-receiving elements; 219a and 219b, which are disposed at the side of the semiconductor laser 201 and respectively have two-divisional light-receiving surfaces, and thereby the reproduction of the information signal can be done.

Finally, regarding the construction of the eighth example of the conventional pickup device, the assembling of the optical pickup apparatus construction is explained referring to FIG. 43. The semiconductor laser 201 is mounted on one end portion of an optical pickup housing 220, and an actuator base 221 is fixedly put on the bottom surface portion 220a thereof. A deflecting prism 222, an outer yoke 223, an inner yoke 224, and a magnet 225 are disposed on the actuator base 221. And further, a movable portion 226 of the actuator on which the objective lens 205 is supported is mounted on the upper portion of such actuator base 221. A focusing coil 227 and a tracking coil 228 are disposed on the side surface of the actuator's movable portion 226. On this occasion, when the electric current flows through the focusing coil 227, the actuator's movable portion 226 can be displaced in the focus direction F. On the other hand, when the electric current flows through the tracking coil 228, the actuator's movable portion 226 can be displaced in the tracking direction T.

In the fifth and sixth examples of the conventional pickup device construction (FIG. 40 and FIG. 41), the reflection light rays reflected on the optical disk 206 or the magneto-optic disk 210 are further reflected by the beam splitter 203, and thereby the reflection light rays can be separated from the outgoing light rays emitted from the semiconductor laser 201 and guided to the light-receiving elements; 209, 213, and 214 in the signal detecting optical system 207 in order to detect the signal. Since the signal detecting optical system 207 is separatedly provided in order to reproduce the signal in such manner, there arise several problems to be solved that the number of the optical parts employed is increased and that the space for the optical system is large-sized, and further, that the weight of the optical pickup portion is also increased and thereby the high-speed seeking operation cannot be performed.

In the seventh example of the conventional pickup device construction (FIG. 42), since there exists no signal detecting optical system 207 as mentioned above, it is possible to realize a small-sized and light-weight optical pickup portion. However, when the outgoing light rays emitted from the semiconductor laser 201 pass through the diffraction grating 215, diffused reflection light rays are generated on the grating surface thereof, and such diffused reflection light rays causes an undesirable phenomenon that the diffused reflection light rays enter the light-receiving elements; 219a and 219b, as flaring light rays. Since the signal level of the flaring light rays is equal to or more than the level of the signal component regularly (properly) detected by the light-receiving elements; 219a and 219b, there arises a problem to be solved that it is impossible to avoid the S/N-level-down of the properly detected signal.

In the eighth example of the conventional pickup device construction (FIG. 43), since the optical pickup portion is constructed such that the actuator base 221 is mounted on the optical pickup housing 220, and further, the actuator's movable portion 226 is mounted on the actuator base 221, the number of the assembled parts is large and therefore the number of the employed parts is increased. This is also a problem to be solved.

SUMMARY OF THE INVENTION

The present invention is made in consideration of the above-mentioned actual circumstances.

It is an object of the present invention to solve the aforementioned points at issue.

It is another object of the present invention to provide an optical pickup apparatus capable of improving the problems to be solved as mentioned heretofore.

It is still another object of the present invention to provide a low-cost optical pickup apparatus constructed with the decreased number of the employed parts and with the reduced assembling works, in which a birefringent crystal is employed as a separation element for separating the illuminating light rays and the detecting light rays from each other, and thereby the optical pickup system of almost one optical path decreases the light amount (light intensity) loss.

It is still another object of the present invention to provide an optical pickup apparatus which is small-sized by employing only one optical path.

It is still another object of the present invention to provide an optical pickup apparatus having a small-sized and simplified optical system of high efficiency for utilizing the light rays.

It is still another object of the present invention to provide a small-sized and light-weight optical pickup apparatus capable of performing high-speed seeking operation.

It is still another object of the present invention to provide an optical pickup apparatus capable of avoiding the decrease of S/N of the properly detected signal.

It is still another object of the present invention to realize an optical system which is extremely small-sized, easy for operating, and in which the variation of the signal due to the positional shift between the respective optical parts is very small.

DETAILED DESCRIPTION OF THE INVENTION

Prior to the description concerning the embodiments of the present invention, some key optical parts in connection with the embodiments and the functions thereof are described, in brief, hereinafter.

In the case of constructing the optical system, it is on very rare occasion to construct the system only with the lens, the prism, and the reflection mirror. For instance, by employing some special parts utilizing the polarization and the diffraction of the light rays, the system can enhance its function and utilize the light rays further effectively.

In forming the optical system, the polarization (deviation of the light rays) cannot be ignored on many occasions. There are two occasions on which the polarization can be utilized positively and harmfully. At any rate, the polarization has something to do with the optical system on many occasions. For instance, when the (semiconductor) laser is employed as the light source of the optical system, since almost all of the lasers emit the linearly-polarized light rays, the starting point of the optical system may become the linear polarization.

Next, the general polarization is explained in brief. The polarization can be classified into three; those are, "linear polarization", "circular polarization", and "elliptical polarization", wherein the linear polarization can be further classified into two; those are, "P-polarization" and "S-polarization".

The technical terms of those polarizations signify the side wave of the light rays to the electromagnetic field and show the shape of the electric field's variation.

Figure 44:
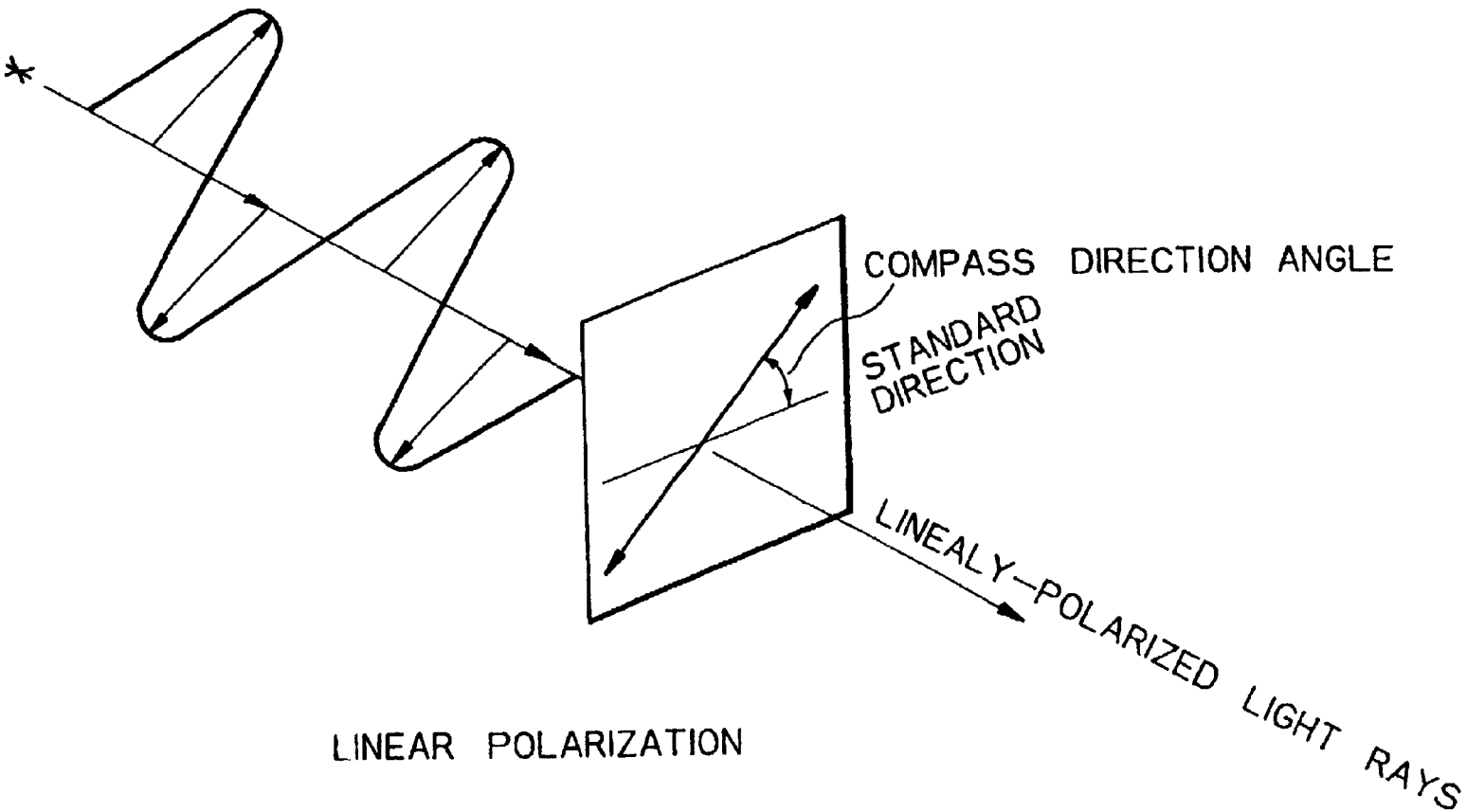
FIG. 44 is a diagram generally illustrating the linear polarization.
Figure 45:
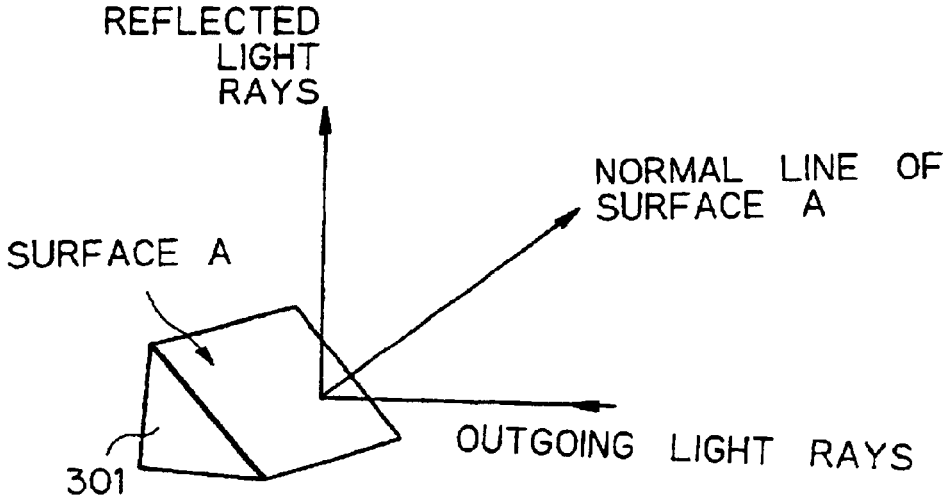
FIG. 45 is a diagram showing the respective directions of the outgoing light rays, the reflection light rays reflected on the surface A of the prism 301, and the normal line of the surface A.

Namely, the linearly-polarized light rays represent the light rays, the electric field of which vibrates (oscillates) only in one direction, as shown in FIG. 44. FIG. 45 shows the respective directions of the outgoing light rays, the reflection light rays reflected on the surface A of the prism 301, and the normal line of the surface A. The oscillation surface of the P-polarized light rays coincides with the surface made by the outgoing light rays and the normal line of the surface A of the prism 301. On the other hand, the oscillation surface of the S-polarized light rays is perpendicular to that of the P-polarized light rays.

Figure 46:
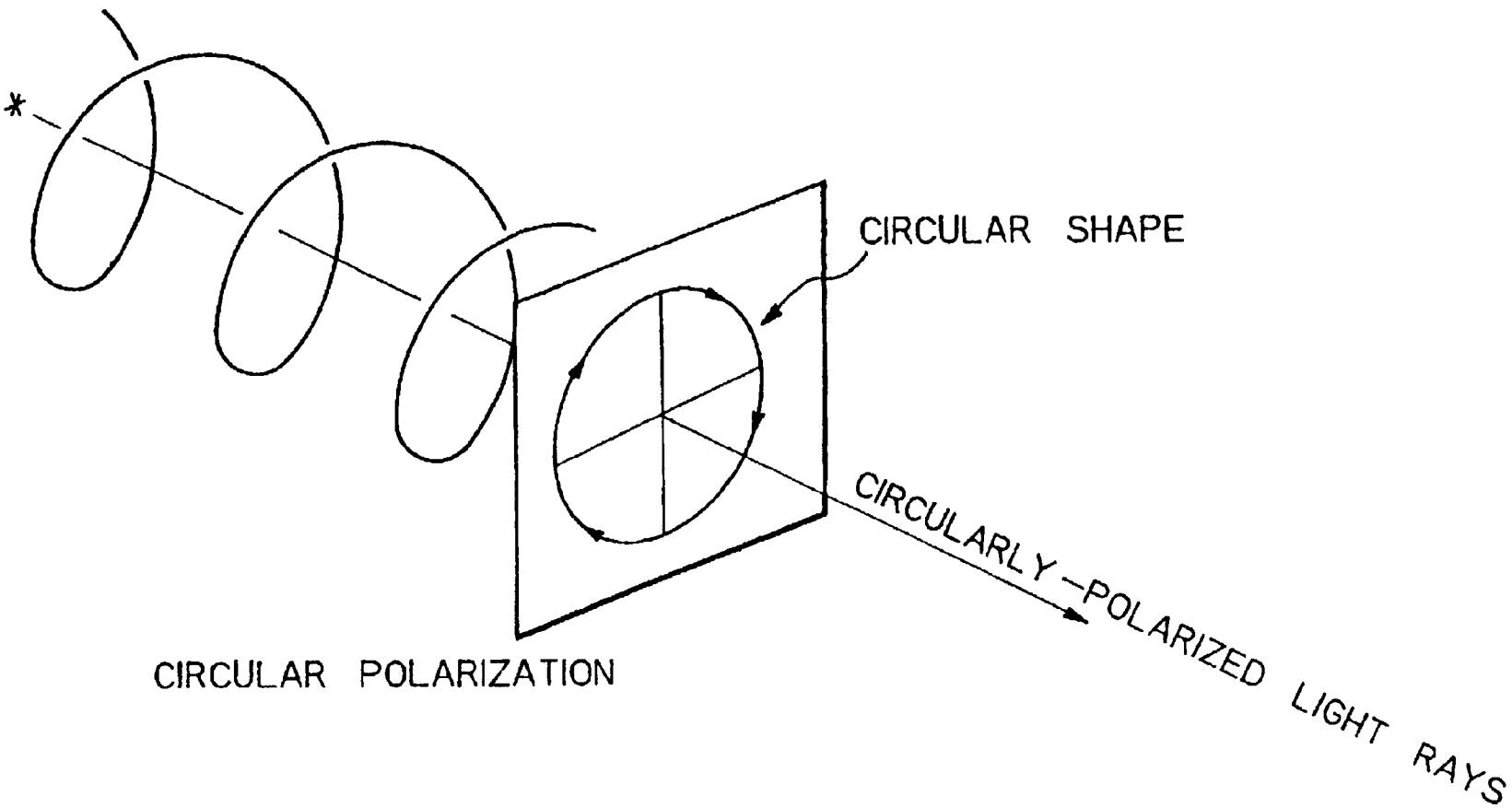
FIG. 46 is a diagram generally illustrating the circular polarization.
Figure 47:
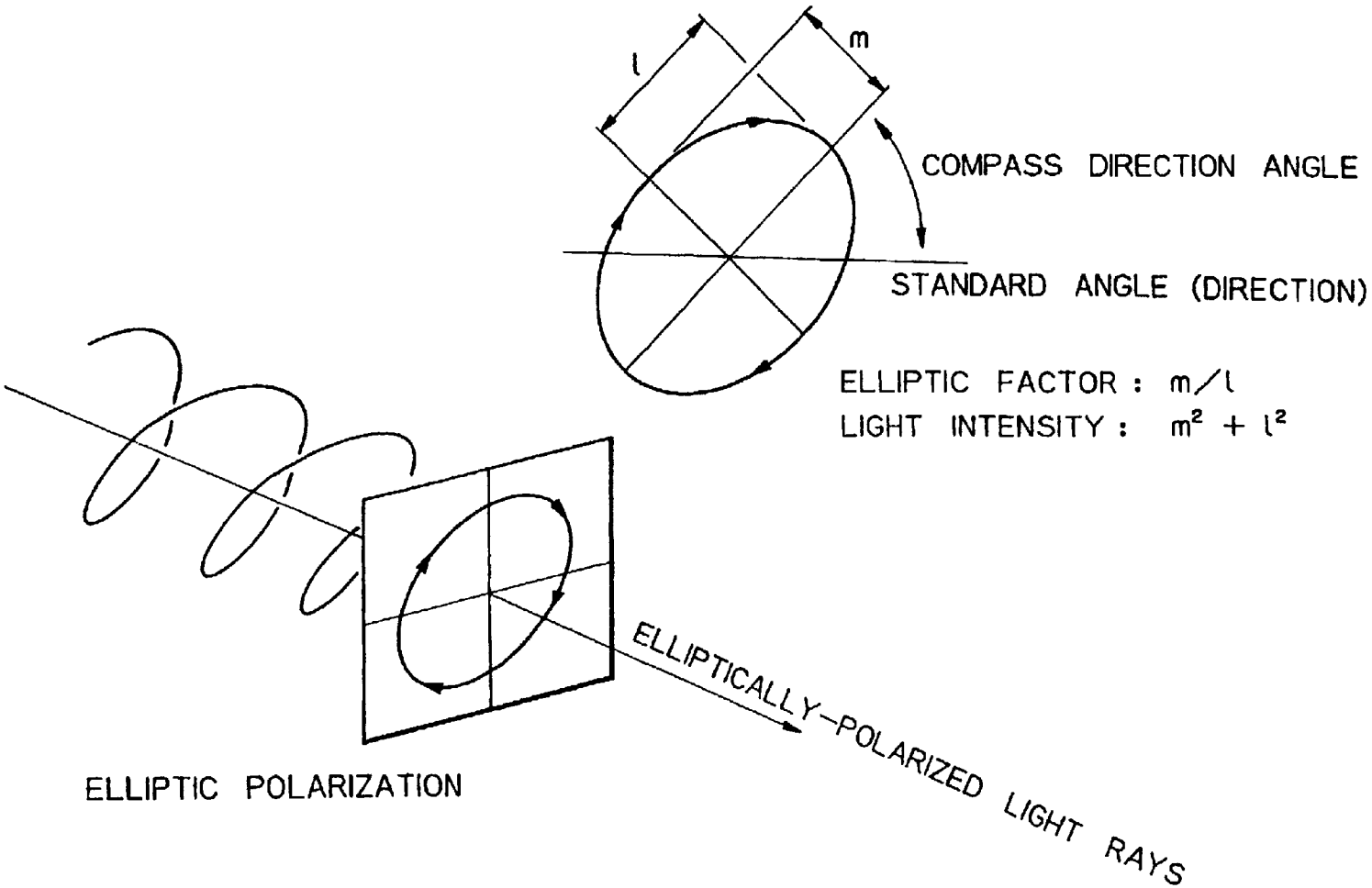
FIG. 47 is a diagram generally illustrating the elliptic polarization.

The circularly-polarized light rays represent the light rays which have a circular orbit of the electric field's vibration viewing at a surface perpendicular to the direction of the light rays' advancing as shown in FIG. 46. The elliptically-polarized light rays represent the light rays which have a elliptic orbit of the electric field's vibration viewing at a surface perpendicular to the direction of the light rays' advancing as shown in FIG. 47.

Figure 48:
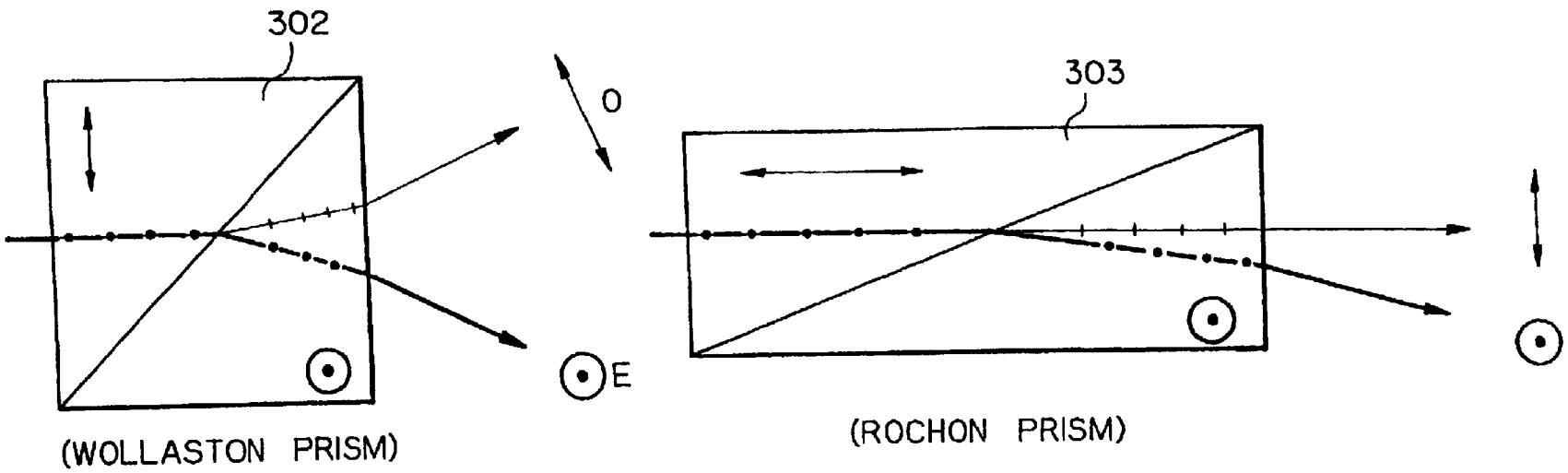
FIG. 48 is a diagram showing the construction and functions of the Rochon prism and the Wollaston prism.

In order to obtain the linearly-polarized light rays from the difference between the advancing directions of the ordinary light rays and the extraordinary light rays, the Wollaston prism 302 and the Rochon prism 303 as shown in FIG. 48 are employed. In particular, the latter is employed for the ultraviolet (UV) light rays on many occasions.

Figure 49:
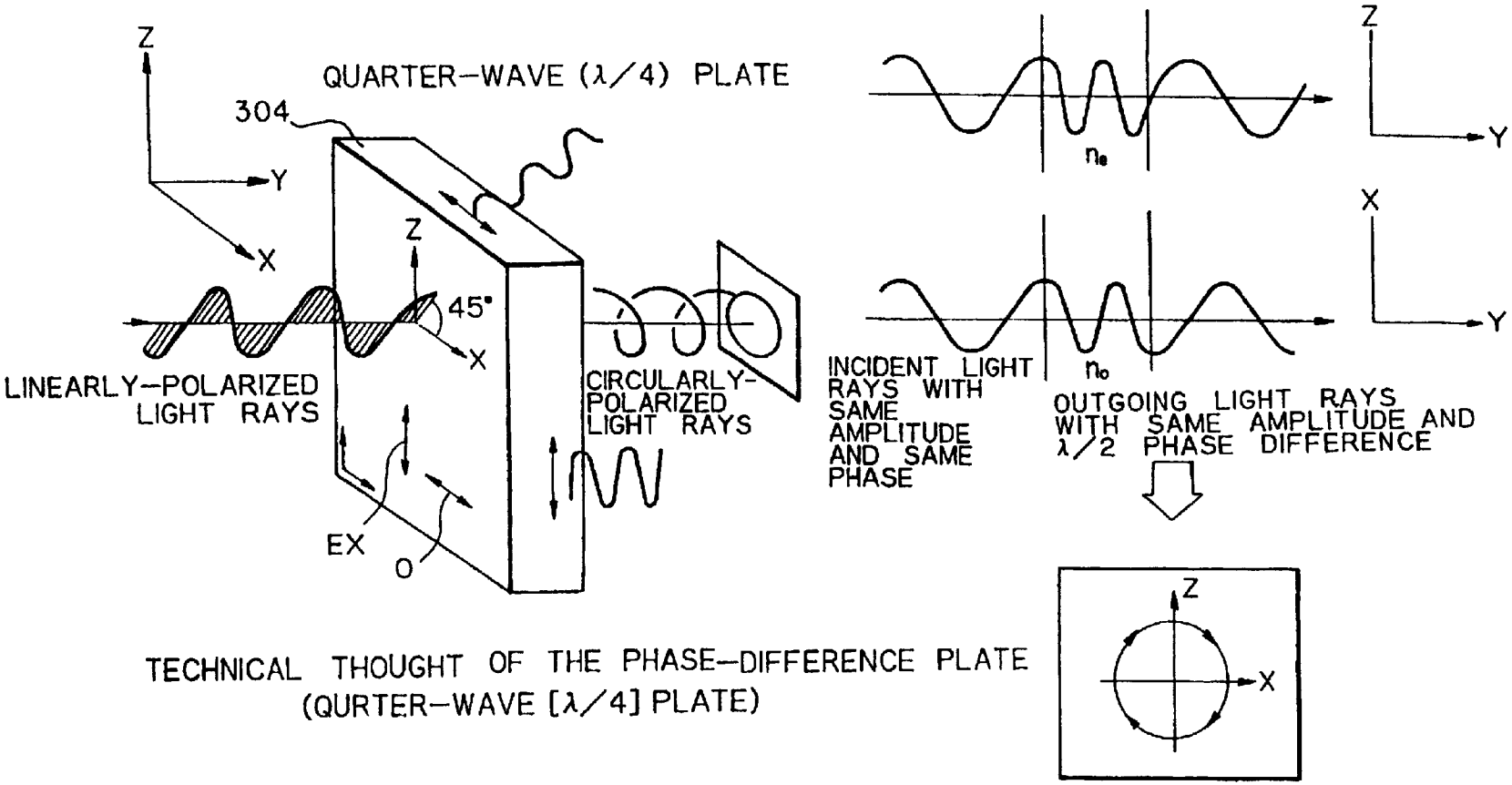
FIG. 49 is a diagram showing the construction and function of the phase-difference (quarter-wave [λ/4]) plate.

Next, an example of the phase-difference plate is explained. The conversion of the linearly-polarized light rays vs. circularly-polarized light rays and the other conversion of the compass direction angle of the linearly-polarized light rays are performed by use of the phase-difference plate. A quarter-wave (λ/4) plate which is one of the representative phase-difference plates is shown in FIG. 49. As shown in FIG. 49, assume the case in which the optical axis is in the Z direction and the linearly-polarized light rays vibrating in the 45° direction from the X axis in the X-Z plane enter the quarter-wave (λ/4) plate 304 perpendicularly thereto in the Y axis direction, as the incident light rays.

Figure 50:
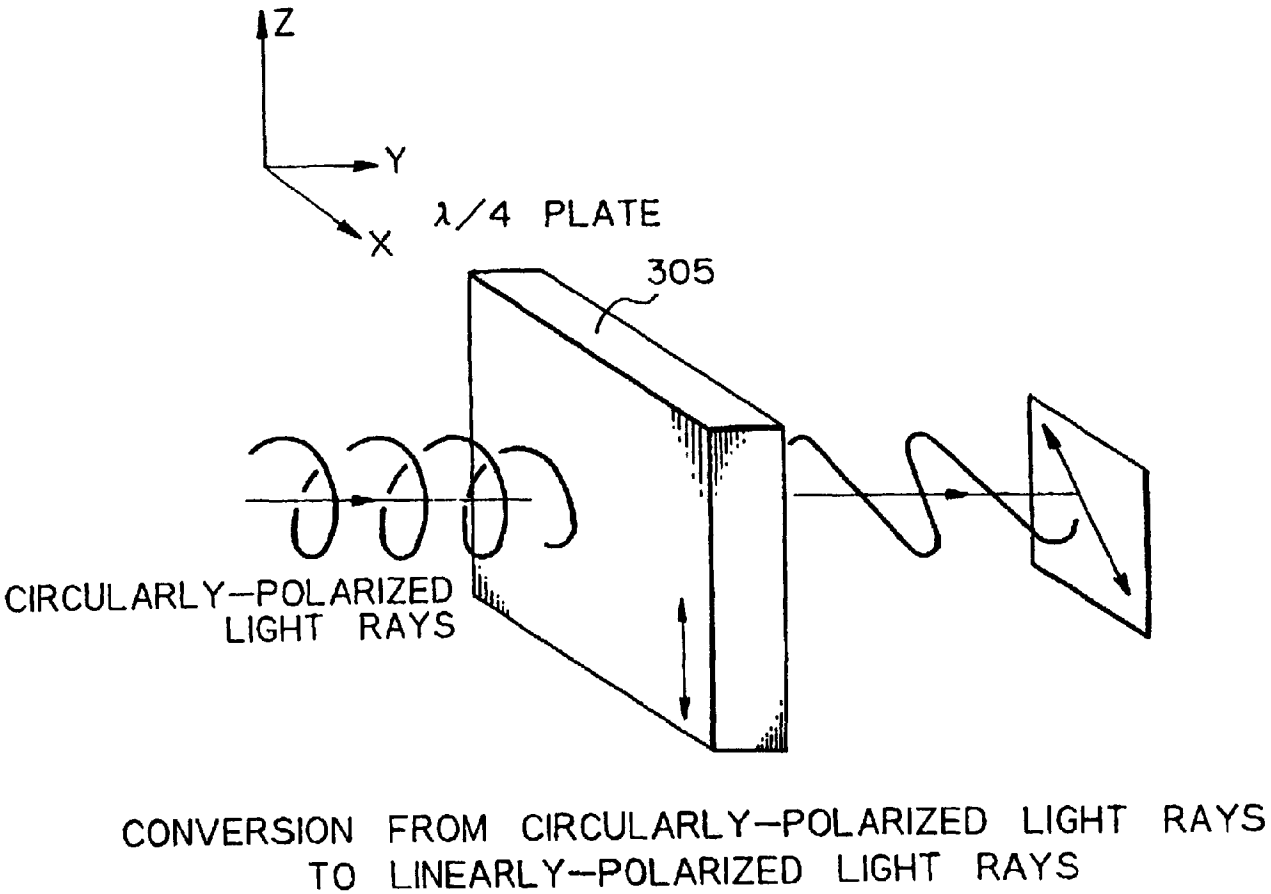
FIG. 50 is a diagram showing the conversion from the circularly-polarized light rays to the linearly-polarized light rays.

The incident linearly-polarized light rays can be thought to be divided into two linearly-polarized light rays components perpendicular to each other. However, since the compass direction angle at the time of entering the λ/4 plate 304 is 45° in the X-Z plane, the amplitude of the component vibrating in the Z axis direction (extraordinary light rays) is equal to that of the component vibrating in the X axis direction (ordinary light rays). Assuming that the refraction index $\eta_e$ of the extraordinary light rays is larger than the refraction index $\eta_o$ of the ordinary light rays, the optical path length of the extraordinary light rays becomes longer than that of the ordinary light rays. Namely, a phase difference may occur between the ordinary light rays and the extraordinary light rays after being transmitted through the λ/4 plate 304. The value of the phase difference turns out to be a quarter-wave (¼) [π/2]. Now, since the amplitude (intensity) of the ordinary light rays is equal to that of the extraordinary light rays, the orbit of the light rays' vibration turns out to become circular in the X-Z plane. This is the circular polarization. To take the incident direction of the light rays inversely, when the circularly-polarized light rays enter the λ/4 plate 305, the linearly-polarized light rays of the compass direction angle of 45° can be obtained, as shown in FIG. 50.

On many occasions, the quarter-wave (λ/4) plate and the half-wave (λ/2) plate are put on the market as the phase difference plate. The λ/4 plate is employed for performing the conversions of the circular polarization vs. the linear polarization and the elliptic polarization vs. the linear polarization.

Figure 51:
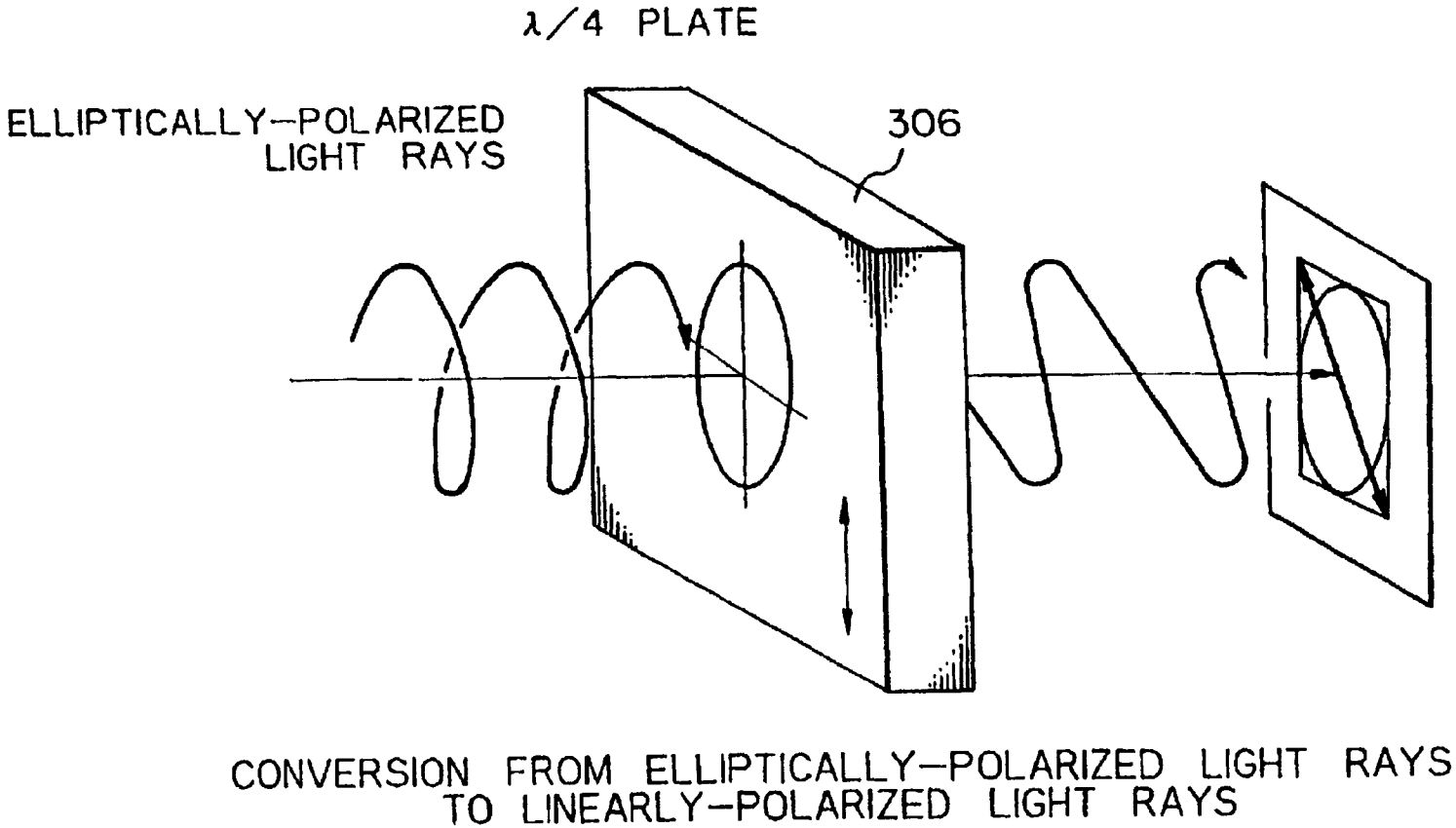
FIG. 51 is a diagram showing the conversion from the elliptically-polarized light rays to the linearly-polarized light rays.

FIG. 51 shows the operation of converting the elliptically-polarized light rays to the linearly-polarized light rays by use of the quarter-wave (λ/4) plate 306. The compass direction angle of the linearly-polarized light rays depends on the ellipse factor (rate) of the elliptic polarization. By use of such effects, the λ/4 plate can be employed for the high-efficiency utilization of the light rays, the high-contrast utilization of the elliptically-polarized light rays, and the measurement of the constant light amount (intensity).

Figure 52:
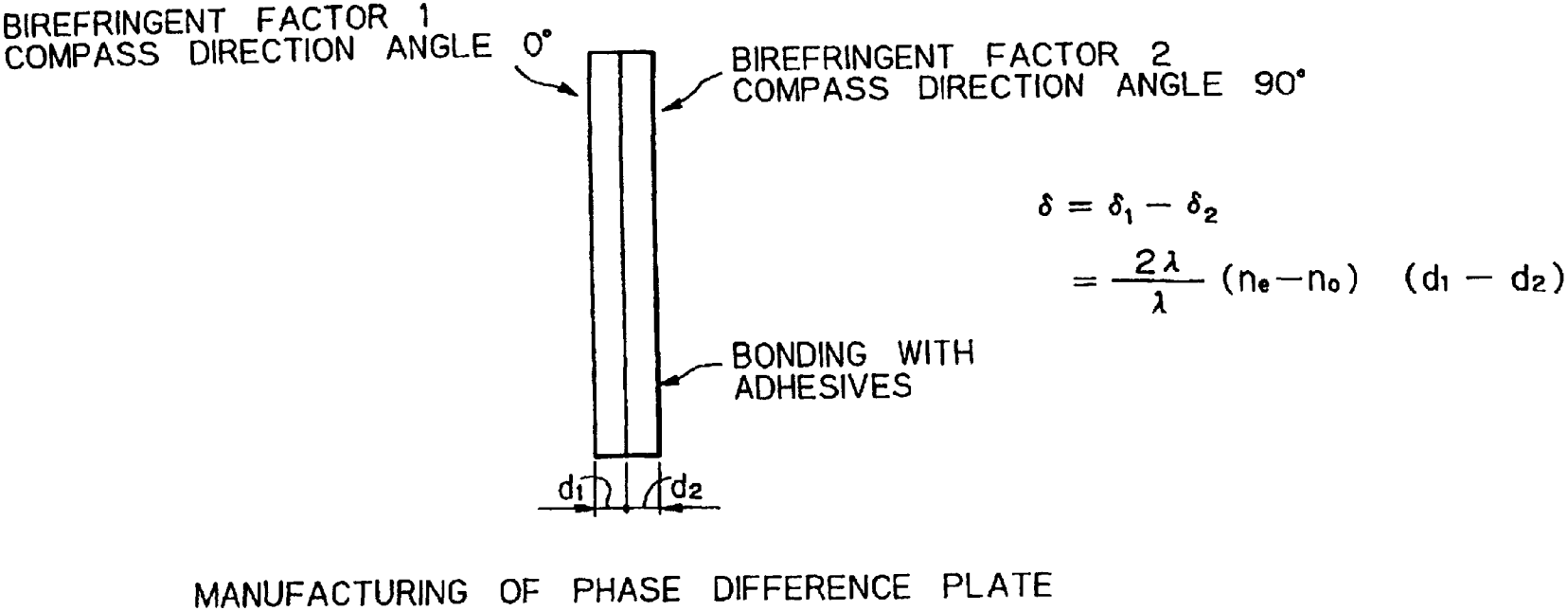
FIG. 52 is a diagram showing the structure and manufacturing method of the phase difference plate.

Next, the method of manufacturing the phase difference plate, referring to FIG. 52. The plate is made of the crystal demonstrating the complex refraction (birefringence). In case that the higher precision is required than that of the phase difference plate made of plastic sheet, the plate is manufactured by polishing under the control of the thickness of the birefringent crystal, such as crystallized quartz or calcareous spar, etc. Two crystal plates having respectively different thicknesses are bonded to each other with adhesives as shown in FIG. 52. The phase difference δ to be obtained can be determined by the difference of two plates' thicknesses in accordance the following equality:

$$\delta = \delta_1 - \delta_2$$

$$= (2\lambda/\lambda)(n_o - n_0)(d_1 - d_2)$$

The fine adjustment of the phase difference is performed by changing the compass direction angle.

DETAILED DESCRIPTION OF THE PREFERRED EMBODIMENTS IN THE FIRST GROUP OF THE INVENTION

In order to attain the afore-mentioned objects, the first group of the present invention is characterized in;

(1) that, in the optical pickup apparatus comprising a light source, an objective lens for focusing the light rays flux emitted from the light source on the optical recording medium, a quarter-wave (λ/4) plate, a light rays flux separating element for separating the reflection light rays reflected on the optical recording medium from the optical axis of the incident light rays, and a light-receiving element for detecting the signal from the reflected light rays, an optical element consisting of birefringent material as the light rays flux separating element is employed, and the separating element is disposed in the divergent optical path just behind the light source, (2) that the incident plane of the light rays flux separating element is not perpendicular to the optical axis, (3) that the light source and the light-receiving element are unitarily constructed, (4) that a plane plate consisting of birefringent material is employed as the light rays flux separating element, (5) that the light rays flux separating element is employed as an outgoing window member of the semiconductor laser, (6) that two pieces of prism consisting of same sort of one uniaxial crystal respectively having optical axes intersecting perpendicularly to each other are employed, and assuming that the refractive index for the ordinary light rays of the prism is $\eta_o$ and the refractive index for the extraordinary light rays is $\eta_e$ when $\eta_e$ is larger than $\eta_o$ ($\eta_o<\eta_e$), the incident angle of the ordinary light rays passing through (transmitted through) the first prism to the second prism is δ, and the counterclockwise angle from the optical axis of the ordinary light rays is assumed to be plus (+) direction, the value of δ becomes larger than zero (δ>0), and on the contrary, when $\eta_o$ is larger than $\eta_e$ ($\eta_o>\eta_e$), the incident angle of the extraordinary light rays passing through (transmitted through) the first prism to the second prism is δ, and the counterclockwise angle from the optical axis of the extraordinary light rays is assumed to be plus (+) direction, the value of δ becomes smaller than zero (δ<0), and (7) that, in (6), two pieces of optical element consisting of the model prism made of the uniaxial crystal of same sort and having a couple of parallel planes are employed.

The definition of the ordinary light rays and the extraordinary light rays is described below in brief. In case that the light rays entering the crystal are divided into two by the action of the birefringence (double or complex refraction) and the light rays having a constant transmission speed regardless of the transmitting direction, such light rays are called the "ordinary light rays". Because the refraction law (principle) regarding the isotropic medium can be applied as it is.

On the contrary, in case that the light rays entering the crystal are also divided into two by the action of the birefringence and the light rays having a variable transmission speed in accordance with the transmitting direction, such light rays are called the "extraordinary light rays." Because the refraction law (principle) regarding the isotropic medium cannot be applied as it is.

The technical term "Birefringence" or "Birefringent Refraction" signifies the double (complex) refraction. When the light rays enter the anisotropic medium such as crystal, there occurs a phenomenon that two refracted light rays appear. As a result, viewing through the above anisotropic medium, the image of the object turns out to be duplicated in general. The vibrating direction of the electric flux density D of the top refracted light rays are perpendicular to each other.

When the light rays pass through the uniaxial crystal, the same are divided into the ordinary light rays and the extraordinary light rays. On the other hand, when the light rays pass through the biaxial crystal, both of the light rays perform the action as the extraordinary light rays.

The preferred embodiments in the first group of the invention are concretely described hereinafter, referring to FIGS. 1 through 10.

Figure 1:
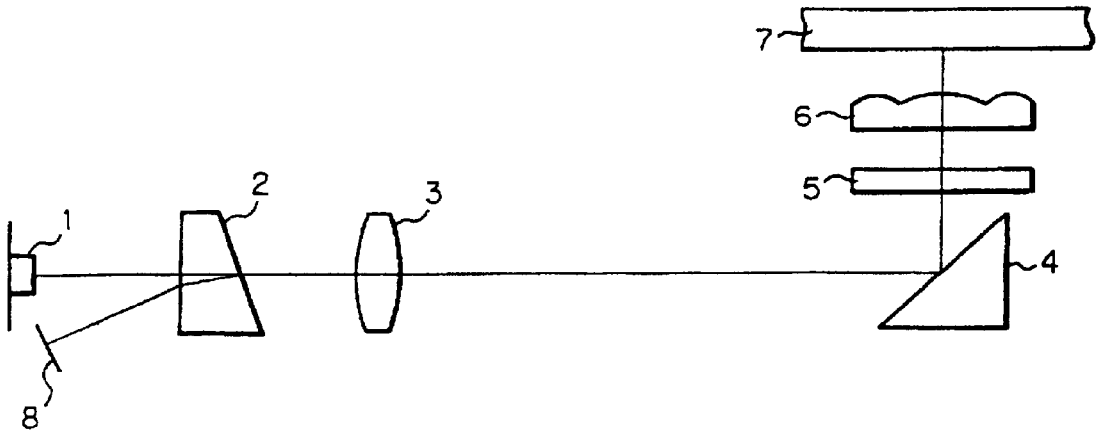
FIG. 1 is a construction diagram for explaining the first embodiment of the optical pickup apparatus according to the present invention.

FIG. 1 is a construction diagram for explaining the first embodiment of the optical pickup apparatus according to the present invention. In FIG. 1, the reference numeral 1 represents a semiconductor laser (LD), 2 a birefringent crystal, 3 a coupling lens, 4 a polarizing mirror, 5 a quarter-wave ($\lambda/4$) plate, 6 an objective lens, 7 an optical recording medium, and 8 a light-receiving element (PD).

The linearly polarized divergent light rays emitted from the semiconductor laser 1 pass through the complex refraction crystal 2, and are converted to the parallel light rays by the coupling lens 3, and further are deflected by the deflecting mirror 4. The light rays deflected by the deflecting mirror 4 are converted to the circularly-polarized light rays by the quarter-wave ($\lambda/4$) plate 5 and focused on the recording surface of the optical recording medium 7 by the objective lens 6. The light rays flux reflected on the recording surface are made parallel again by the objective lens 6 and the same are converted to the linearly-polarized light rays having a polarising surface relatively rotated by 90° to the incident light rays by the quarter-wave ($\lambda/4$) plate 5. The light rays thus converted by the quarter-wave ($\lambda/4$) plate 5 are reflected on the deflecting mirror 4 and are given a a focusing tendency by the coupling lens 3, refracted by the complex refraction crystal 2 in a direction different from that of the illuminating light rays, and are guided to the light-receiving element 8.

Figure 2:
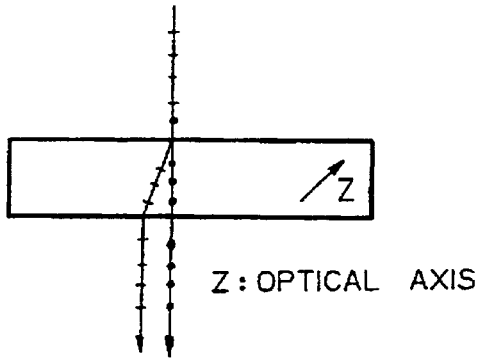
FIG. 2 is a diagram for explaining the complex refraction (birefringence) due to the birefringent crystal according to the present invention.

Next, the reason why the birefringent crystal functions as the light rays flux separating element is explained. At first, when the light rays enter the parallel plain plate made of uniaxial crystal perpendicularly thereto (at this time, the optical axis [crystal axis] is not parallel with the boundary surface), the light rays are divided into two; namely, into the polarized component going forward straight and the other polarized component refracted on the boundary surface, as shown in FIG. 2. Such phenomenon occurs due to the difference of the refractive index of the medium for the respective polarizing components, and it is called "a birefringence (complex refraction)". The former one and the latter one are respectively called "ordinary light rays" and "extraordinary light rays". In the biaxial crystal, both of of two polarized components function as the extraordinary light rays and the phenomenon of the birefringent refraction appears also. If the birefringent refraction is utilized, it is possible to separate those two linearly-polarized light rays by directing the light rays in the different directions.

Furthermore, the boundary surface of the light rays flux separating element consisting of the birefringent crystal can be constructed and disposed not so as to be perpendicular to the optical axis.

Figure 3:
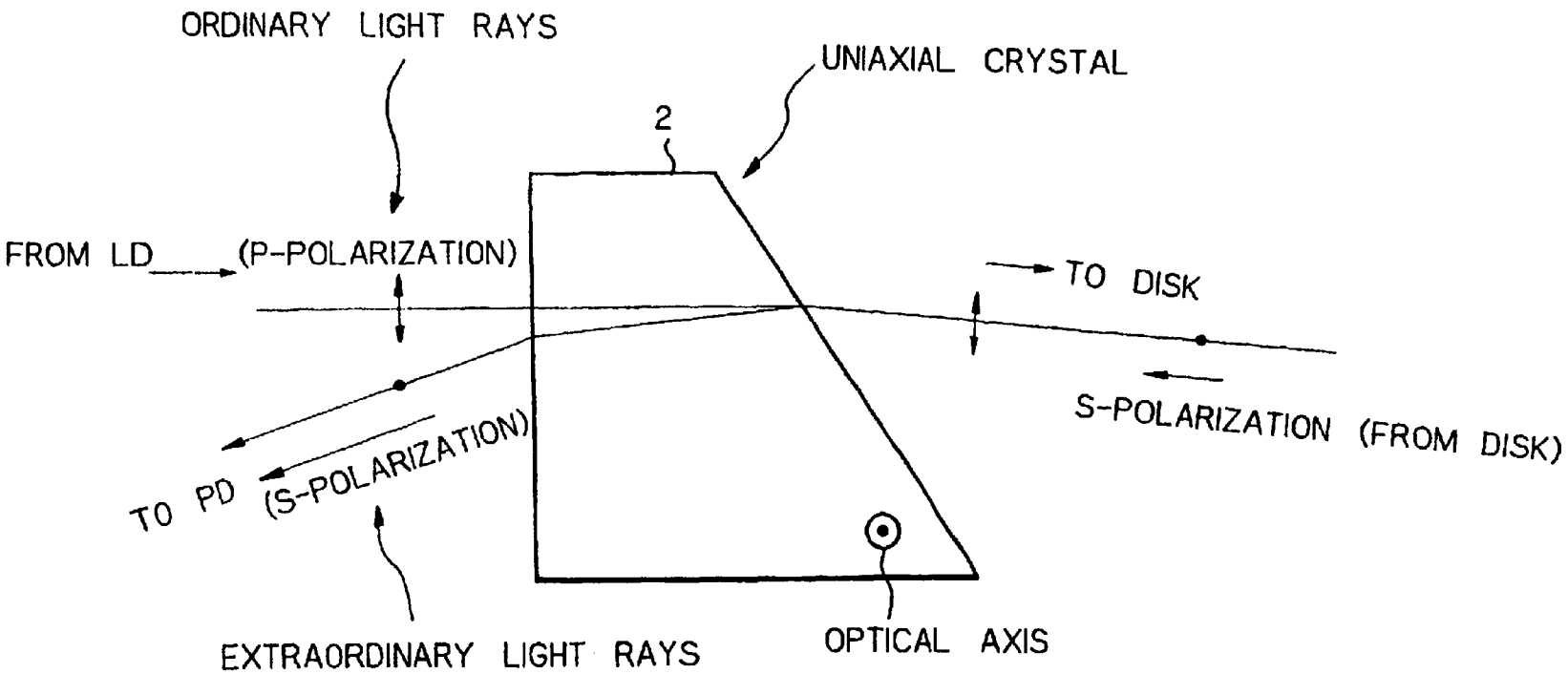
FIG. 3 is a diagram for explaining the light rays flux separating portion of the birefringent crystal shown in FIG. 1.

FIG. 3 is a diagram for explaining the light rays flux separating portion of the birefringent crystal shown in FIG. 1.

When the outgoing light rays emitted from the semiconductor laser are P-polarized (the polarizing direction is perpendicular to the paper) and enter the uniaxial crystal having an optical axis perpendicular to the paper, the light rays function as the ordinary light rays. Namely, if the incident boundary surface is perpendicular to the optical axis (the light rays enter perpendicular thereto), the light rays proceed straight, and if the light rays enter slantedly thereto as the incident light rays, the same are refracted in a direction satisfying the Snell's Law with the refractive index $\eta_o$ for the ordinary light rays. The detection light rays reflected on the optical recording medium return through the same optical path as the S-polarized light rays.

When the light rays are S-polarized and enter the uniaxial crystal as shown in FIG. 3, the same light rays function as the extraordinary light rays. Even though the light rays enter perpendicularly thereto, the same do not proceed straight. When the light rays enter slantedly thereto, the same are refracted in the direction satisfying the Snell's Law with the refractive index $\eta_e$ for the extraordinary light rays. In case that the biaxial crystal is employed, the light rays function as the extraordinary light rays of the refractive indexes (indices) different from each other, and thereby it is possible to separate the illuminating light rays and the detecting light rays as in the case of the uniaxial crystal.

Figure 53:
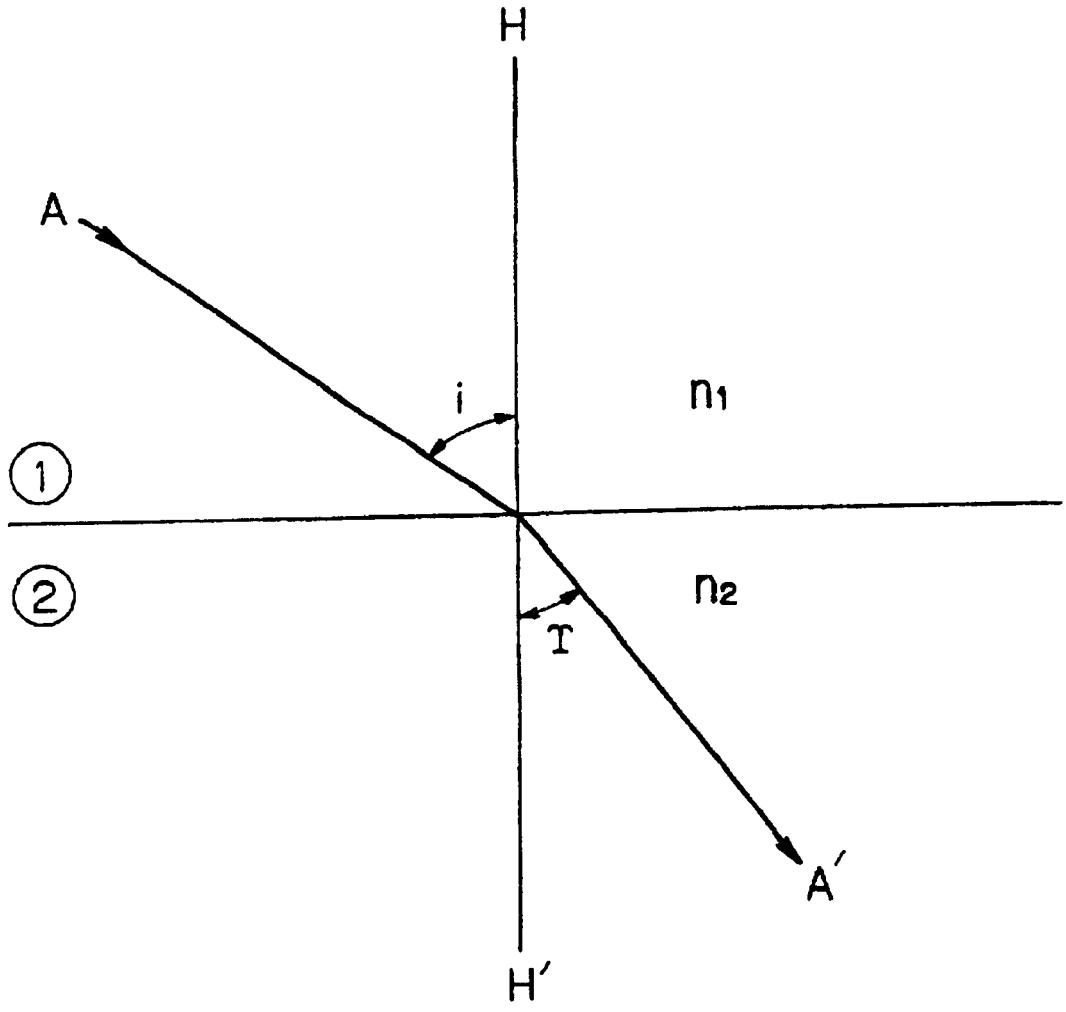
FIG. 53 is a diagram for explaining the Snell's Law.

The definition of the Snell's Law is mentioned below in brief. When the light rays are refracted on the boundary surface between two isotropic non-conductive medium of different refractive index, a constant relationship is established between the incident light rays direction and the refracted light rays direction, in accordance with the Snell's Law. As shown in FIG. 53, assuming that the direction of the incident light rays entering from a medium of the refractive index $\eta$, to another medium of the refractive index $\eta_2$ at the point O is AO, the direction of the refracted light rays is A'O, and the normal line of the boundary surface therebetween is HOH', the incident surface including AO and HO coincides with the refractive surface including A'O and OH', and AO and A'O are respectively situated at the opposite side to each other in relation to HOH'. And further, a relationship as mentioned below between the incident angle ∠AOH(L) and the refractive angle ∠AOH' ($\tau$):

$$\sin L/\sin \tau=\eta_2/\eta_1,$$

wherein the ratio is constant regardless of the incident angle L.

Figure 4:
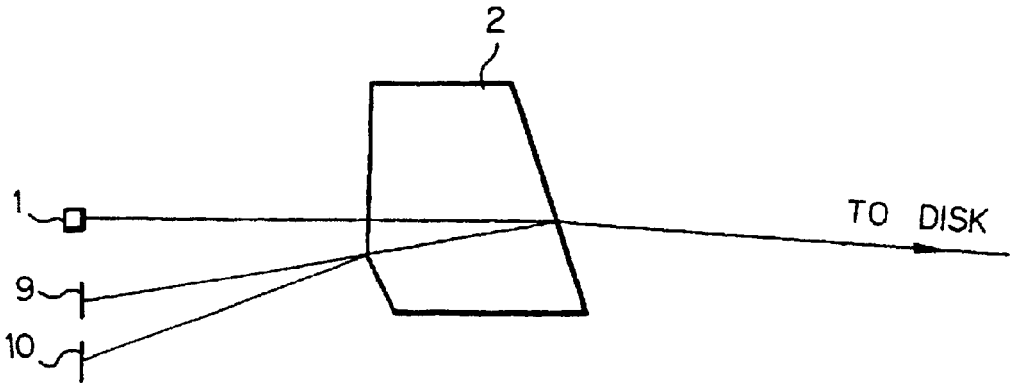
FIG. 4 is a diagram showing the example of focus detecting by use of the knife-edge method according to the present invention.

The astigmatism method utilizing the astigmatism caused by the birefringent crystal is adopted for detecting the focus. Otherwise, as shown in FIG. 4, the focus detection can be done also with the knife-edge method by employing the complex refraction crystal element provided with a surface for refracting a part of the separated detection light rays in the other direction. The track detection can be done with the ordinary push-pull method. The Rf signal can be detected from the variation of the summed light intensity of the detected light rays. And further, in FIG. 4, the reference numeral 9 represents the PD for the track signal, and 10 the PD for the focus singal.

Figure 5:
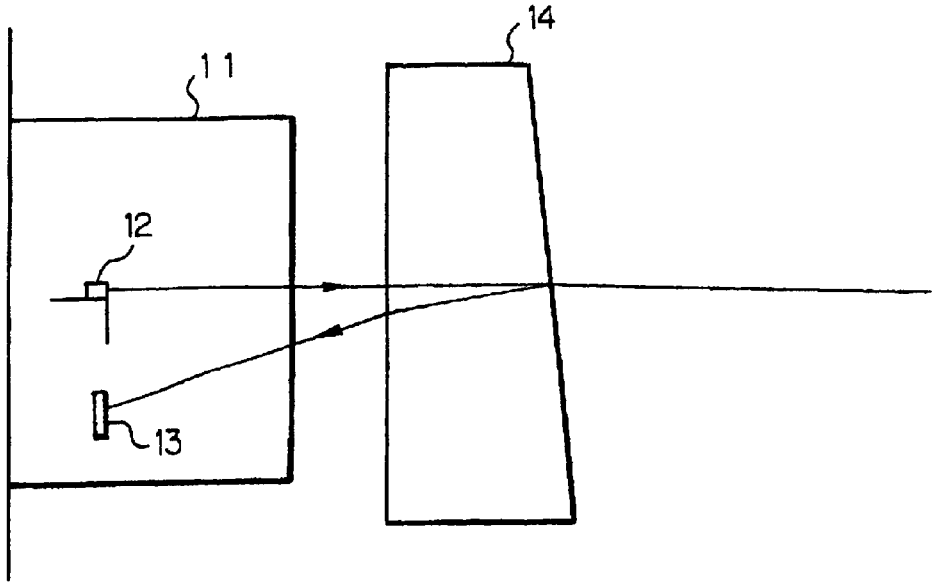
FIG. 5 is a construction diagram for explaining the second embodiment of the optical pickup apparatus according to the present invention.
Figure 6:
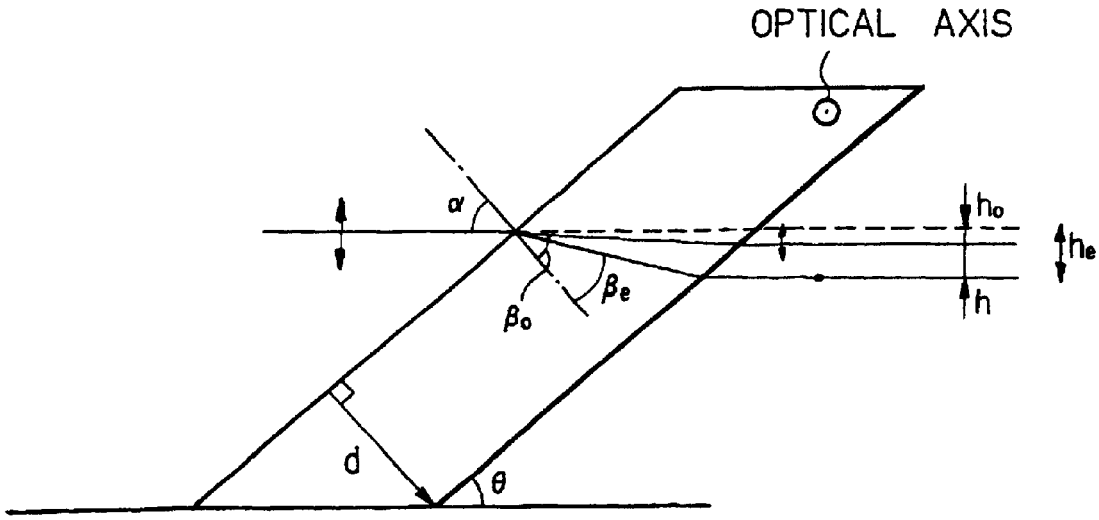
FIG. 6 is a diagram showing the example of employing a parallel plain plate birefringent crystal according to the present invention.

FIGS. 5 and 6 are construction diagrams showing the other embodiment (second embodiment) of the optical pickup apparatus according to the present invention. In FIG. 5, the reference numeral 11 represent a semiconductor laser (LD) package, 12 an LD chip, 13 a light-receiving element (PD), and 14 a birefringent crystal.

The PD 13 is accommodated in the LD package 11. The separation distance of the LD chip 12 and the PD 13 can be determined from the parameters; the refractive index and the thickness of the complex refraction crystal, and the angle of the incident light rays. For instance, in case that the parallel plain plate made of the birefringent material of the thickness d as shown in FIG. 6 is disposed slantedly by $\theta$ for the optical axis, the separation distance can be expressed as mentioned below.

Assuming that the incident angle to the birefringent material is $\alpha$, the refractive index of the refraction line of the ordinary light rays in the birefringent material is $\eta_o$, the refraction angle thereof is a $\beta_o$, the refractive index of the refraction line of the extraordinary light rays in the birefringent material is $\eta_e$, and the refraction angle thereof is $\beta_e$, and when the below equality;

$$\alpha=90-\theta$$

is assumed, the following equalities are established.

$$\beta_o=\sin^{-1}[(\cos\theta/\eta_o)],$$

$$\beta_e=\sin^{-1}[(\cos\theta/\eta_e)] \qquad \text{[Equalities-1]}$$

Assuming that the variations of the height from the incident light rays axis are $h_o$, $h_e$ respectively, $$h_o=(d/\cos\beta_o)\cdot\sin\tau=(d/\cos\beta_o)\cdot\cos(\theta+\beta_o),$$

$$\tau=90-(\theta+\beta_o)$$

$$h_e=(d\cos\beta_e)\cdot\sin\tau=(d/\cos\beta_e)\cdot\cos(\theta+\beta_e),$$

$$\tau=90-(\theta+\beta_e)$$

Consequently, the difference h between the optical axes of the P- and S-polarizations is given by the below equality:

$$h=h_o-h_e$$

Figure 7:
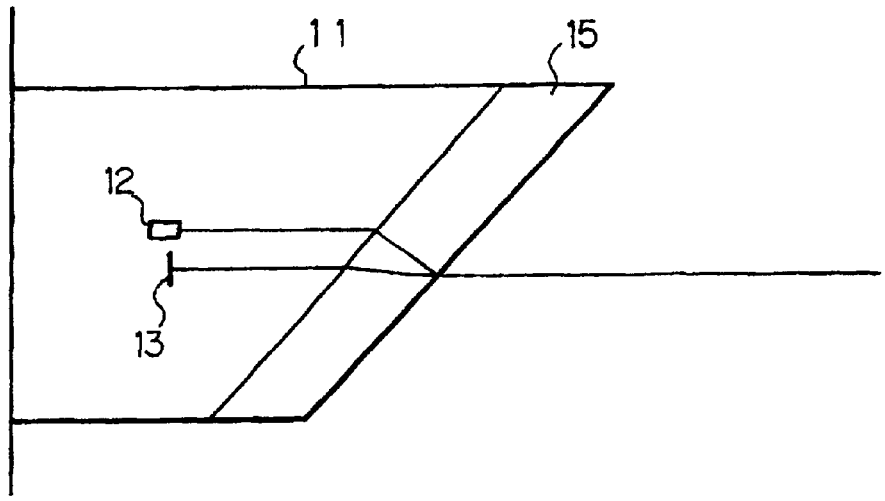
FIG. 7 is a construction diagram for explaining the third embodiment of the optical pickup apparatus according to the present invention.

FIG. 7 is a construction diagram for explaining the other embodiment (third embodiment) of the optical pickup apparatus according to the present invention. In FIG. 7, the reference numeral represents a birefringent crystal, and same reference numeral is attached to the portion executing the same function as that of the optical pickup apparatus shown in FIG. 5. The birefringent crystal 15 is employed as the window member of the LD package 11 for both of the LD chip and the PD 13.

Figure 8:
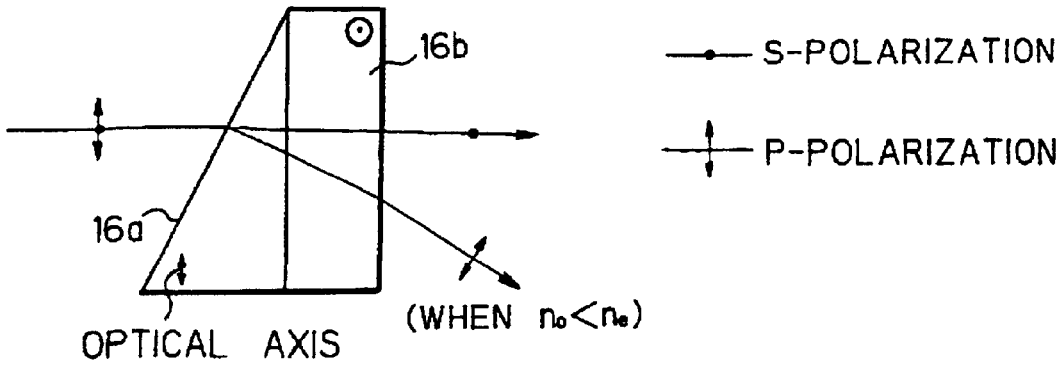
FIG. 8 is a construction diagram for explaining the fourth embodiment of the optical pickup apparatus according to the present invention.

FIG. 8 is a construction diagram for explaining the still other embodiment (fourth embodiment) of the optical pickup apparatus according to the present invention. The reference numerals 16a and 16b represent, respectively, the first prism and the second prism of the uniaxial crystal constructing the birefringent crystal. This example (embodiment) shows the case of $\eta_o<\eta_e$. The optical axis of the prism 16a made of the uniaxial crystal is in a vertical direction on the paper, while the optical axis of the prism 16b is in a direction perpendicular to the paper. In the prism 16a, the P-polarized light rays behave as the extraordinary light rays and the S-polarized light rays behave as the ordinary light rays. As shown in FIG. 8, when the light rays slantedly enter the prism 16a, the P-polarized light rays are refracted to a larger extent than the S-polarized light rays.

Next, the respective P- and S-polarized light rays enter the prism 16b as the incident light rays, the P-polarized light rays behave as the ordinary light rays and the S-polarized light rays behave as the extraordinary light rays. Consequently, the entering of the incident light rays into the prisms from 16a to 16b signifies the entering of the light rays from the medium of large refractive index to that of small refractive index in the case of the P-polarization. On the contrary, the same signifies the entering of the light rays from the medium of small refractive index to that of large refractive index in the case of the S-polarization. In such situation, the angle established by the P- and S-polarizations is widened.

Figure 9:
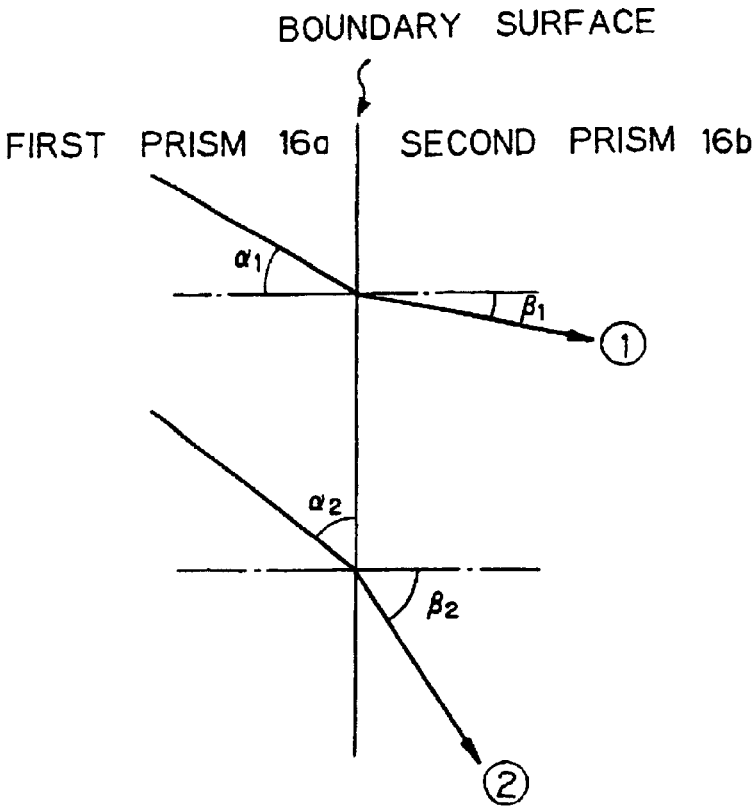
FIG. 9 is a diagram showing the state of the prism's refraction in FIG. 8.

Next, the state of the refraction by use of those prisms is explained, referring to FIG. 9. Assuming that when the incident angle $\alpha$, of the polarized component ① having small refractive index in the first prism 16a to the second prism 16b ($\alpha_1=\delta$, $-90<\alpha_1<90$) is positive ($\delta>0$), the refraction angle of the component ① to the second prism 16b is $\beta_1$, and further, when the incident angle of the polarized component ② having large refractive index in the first prism 16a is $\alpha_2$ and the refraction angle of the component ② to the second prism 16b is $\beta_2$, $\alpha_1$ is smaller than $\alpha_2$ ($\alpha_1<\alpha_2$), and for the component ①, the state of the incident light rays turns out to be "small refractive index→large refractive index", and for the component ②, the same turns out to be "large refractive index→small refractive index". In consequence, since $\alpha_1>\beta_1$ and $\alpha_2>\beta_2$, $(\alpha_1-\alpha_2)<(\beta_2-\beta_1)$, and the separation angle turns out to be made large by the action of the prism.

Figure 10A:
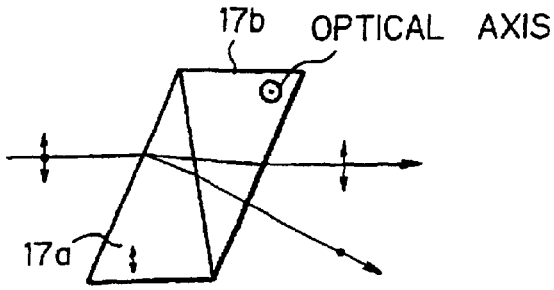
FIGS. 10a through 10d are diagrams showing the example of employing same-shaped model prism consisting of uniaxial crystal used as birefringent crystal according to the present invention.

FIG. 10a through 10d are diagrams showing the example of employing same-shaped model prism consisting of uniaxial crystal used as the berefringent crystal according to the present invention. In FIGS. 10a through 10d, the reference numerals 17a through 17c represent the model prisms having optical axes respectively different from each other. FIG. 10a shows the construction of the Wollaston-type prism constructed in a state of parallel plain plate by sticking (pasting) the model prism 17a and the other model prism 17b together on the condition of $\eta_e<\eta_o$.

Figure 10B:
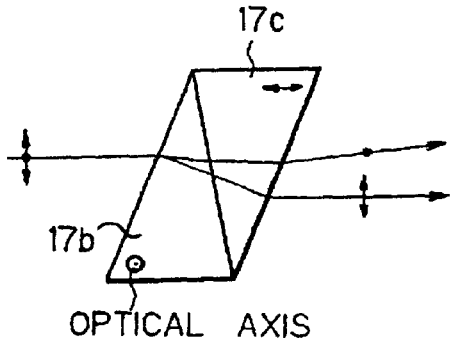

FIG. 10b shows the construction of the prism constructed in a state of parallel plain plate by sticking the model prism 17b and the other model prism 17c together on the condition of $\eta_e<\eta_o$.

Figure 10C:
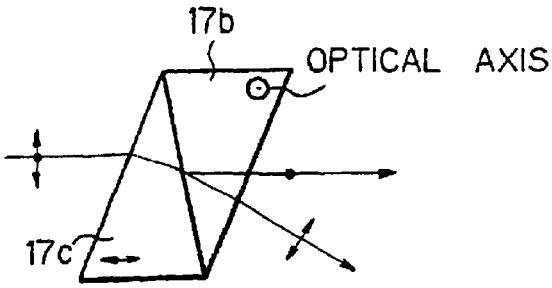

FIG. 10c shows the construction of the Rochon-type prism constructed in a state of parallel plain plate by sticking the model prism 17c and the other model prism 17b together on the condition of $\eta_o<\eta_e$.

Figure 10D:
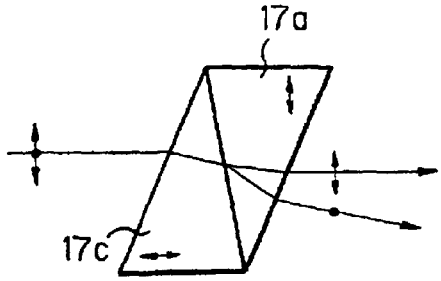
Figure 11:
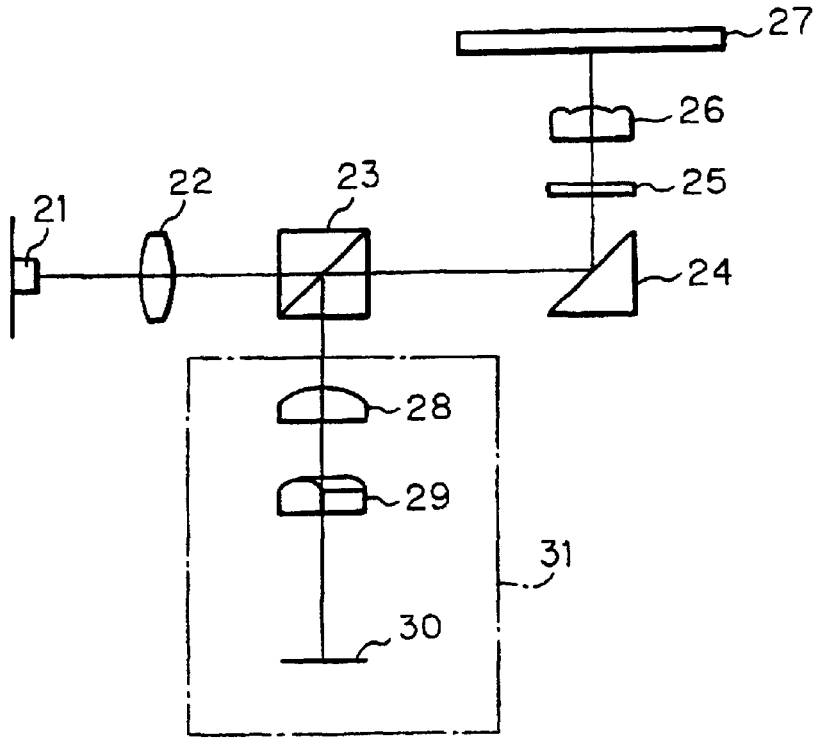
FIG. 11 is a construction diagram for explaining the first example of the conventional optical pickup device.

FIG. 10d shows the construction of the prism constructed in a state of parallel plain plate by sticking the model prism 17c and the other model prism 17a together on the condition of $\eta_o<\eta_e$.

As mentioned heretofore, according to the present invention, the semiconductor laser (LD) and the light-receiving element (PD) are unitarily combined into one, and both of the illuminating system from the LD to the recording medium and the detecting system from the recording medium to the PD can be disposed on almost same optical path. Thereby, it is possible to simplify and small-size the optical pickup. On that occasion, the optical element made of the birefringent material (uniaxial crystal, biaxial crystal, etc.) is employed for separating the illuminating light rays and the detecting light rays.

Finally, the functional effects of the embodiments in the first group of the invention are described hereinafter. As is apparent from the foregoing description, according to the present invention, the following effects can be expected:

(1) Effect-1

An optical system of optical pickup in which the optical path of the illumination light rays is almost equal to that of the detecting light rays can be constructed by employing the light rays flux separating element consisting of the birefringent crystal. Thereby, the number of the employed parts can be reduced, and consequently the low-cost and small-sized optical pickup can be realized compared with the conventional one.

(2) Effect-2

The incident plane is made not perpendicular to the optical axis, and thereby the returning light rays to the LD can be reduced and the LD can be driven stably. In consequence, the optical pickup of high reliability can be provided. Furthermore, by slantedly disposing the optical pickup, the separation distance of the illuminating light rays and the detecting light rays can be changed easily and thereby the margin for designing can be widened.

(3) Effect-3

Since the LD and the PD are unitarily constructed in one package, the number of the employed parts can be reduced, the easiness of assembling can be improved. Consequently, the low-cost and small-sized optical pickup can be realized.

(4) Effect-4

The parallel plain plate can be made easily and it contributes to the low-cost of the optical pickup.

(5) Effect-5

Since the LD, the PD, and the light rays flux separating element can be unitarily constructed as a single part combined by employing the light rays flux separating element consisting of the birefringent crystal as the window member of the one-unit package for the LD and the PD, the number of the employed parts can be reduced, the easiness of assembling can be improved. Consequently, the low-cost and small-sized optical pickup can be realized.

(6) Effect-6

A large separation angle can be obtained by employing two pieces of uniaxial crystal respectively having different optical axes, and thereby the above-mentioned optical pickup can be made further small-sized.

(7) Effect-7

It is possible to make the light rays flux separating element attaining same effect as mentioned in (6) at further low cost by employing a model prism of same shape. Furthermore, in the case of using the Wollaston-type prism, the Rochon-type prism, etc., the margin of selecting the direction of the two separated light rays can be widened in accordance with the method of selecting the optical axis.

DETAILED DESCRIPTION OF THE PREFERRED EMBODIMENTS IN THE SECOND GROUP OF THE INVENTION

In order to attain the afore-mentioned objects, the second group of the present invention is characterized in;

(1) that, in the optical pickup apparatus for focusing the light rays flux emitted from a semiconductor laser through an objective lens onto an optical information recording medium in order to form a small spot thereon and for performing the operations of recording, reproducing, and erasing the optical information, the afore-mentioned semiconductor laser and light-receiving element are formed on a single (same) stem, and the light rays flux passes (is transmitted) through the laser beam in the order of a uniaxial crystal plate, a collimating lens, and a beam shaping element and is guided to the objective lens, (2) that the respective heights of the semiconductor laser and the light-receiving element differ from each other, (3) that, in the optical pickup apparatus for focusing the light rays flux emitted from a semiconductor laser through the objective lens onto the optical information recording medium in order to form a small spot thereon and for performing the operations of recording, reproducing, and erasing the optical information, the afore-mentioned semiconductor laser and light-receiving element are formed on a single (same) stem, and the light rays flux is guided to the objective lens through the uni axial crystal plate having an unsuccessive surface partly formed thereon, (4) that, in (3), the light-receiving element on the stem consists of two-divisional two light-receiving elements different in the divisional direction from each other, and one of the light-receiving elements is on the same level as that of the semiconductor and one another of the light-receiving elements is on the different level from that of the semiconductor, and (5) that, in (1) or (3), the uniaxial crystal plate is unitarily hermetically sealed in the package consisting of the afore-mentioned semiconductor laser and light-receiving element.

The embodiments in the second group of the invention are described hereinafter.

Figure 12A:
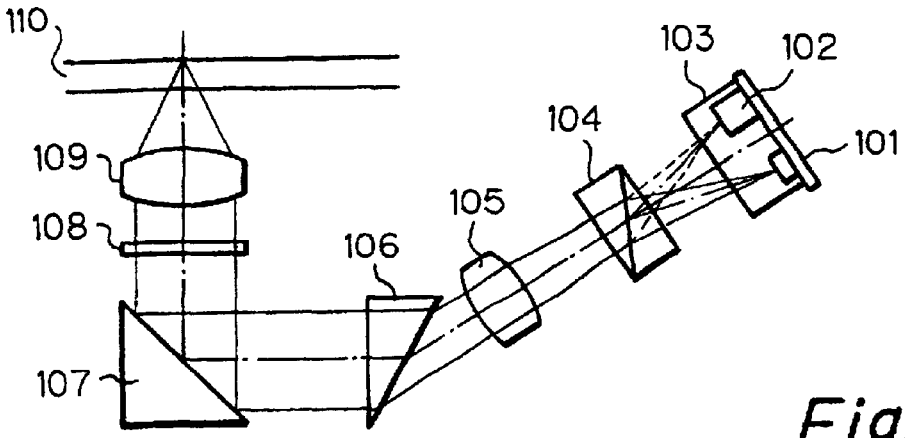
FIGS. 12a and 12b are construction diagrams for explaining the fifth embodiment of the optical pickup apparatus according to the present invention.
Figure 12B:
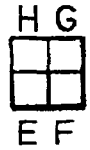

FIGS. 12a and 12b are construction diagrams for explaining the fifth embodiment of the optical pickup apparatus according to the present invention. In FIG. 12a, the reference numeral 101 represents a simiconductor (LD), 102 a four-divisional light-receiving element, 103 a package, 104 an element, 105 a collimating lens, 106 a beam-shaping prism, 107 a deflecting prism, 108 a quarter-wave (λ/4) plate, 109 an objective lens, and 110 an optical information recording medium. FIG. 12b shows the four-divisional light-receiving element 102 in FIG. 12a.

The hermetically sealed package in which the semiconductor laser 101 and the four-divisional light-receiving element 102 are unitarily mounted on a stem and the element employing the uniaxial crystal plate such as crystallized quartz plate are employed. In the embodiment, the Wollaston prism (WP) consisting of a pair of uniaxial crystal plates respectively having different crystal axes is employed as the element 104.

The light rays flux emitted from the semiconductor laser 101 is P-polarized such that the vibrating direction thereof is parallel with the paper. After bending the optical path by use of the element 104, the light rays are converted to the parallel light rays by the collimating lens 105 and the beam of the light rays is enlarged by the beam shaping prism 106. The light rays are further converted to the circularly-polarized light rays by the quarter-wave (λ/4) plate 108 through the deflecting prism 107 and focused by the objective lens 109 onto the optical information recording medium 110 in order to form an extremely small spot thereon. In such manner, the operations of recording, reproducing, and erasing the information are performed. The reflected light rays pass through the objective lens 109 and the quarter-wave (λ/4) plate 108. Thereafter, the same are converted to the S-polarized light rays, and the vibrating direction thereof is perpendicular to the paper. The light rays thus converted (S-polarized) pass through the deflecting prism 107, the beam shaping prism 106 and the collimating lens 105, and are bent in a direction different from that of the P-polarization. The focus error signal and the track error signal are detected by the four-divisional light-receiving element 102, and the information signal is detected by all of the summed signals.

Figure 13:
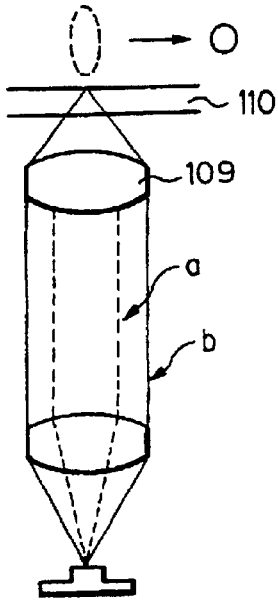
FIG. 13 is a diagram for explaining the shape of the light rays beam according to the present invention.

In such construction, assuming that the emission pattern of the semiconductor laser 101 is wide in a direction perpendicular to the laminating direction of the light-emitting element and the same is narrow in another direction parallel therewith as shown in FIG. 13, the spot in a direction parallel with the optical information recording medium 110 becomes wide elliptical spot as shown by the dotted line a in FIG. 13. For this reason, the parallel direction is widened by use of the beam shaping prism 106, and thereby a small spot same as in the perpendicular direction. Since the element 104 executes the operation of transforming the beam only in one direction, there occurs no astigmatism when the reflected light rays returns to a state of being parallel at the time of being focused. However, in case that the optical information recording medium 110 is more distant than the focused position, there occurs the phenomenon of astigmatism when the reflected light rays returns to the beam shaping prism 106 as the focused light rays. On the contrary, in case that the optical information recording medium 110 is nearer than the focused position, there occurs also the phenomenon of astigmatism when the reflected light rays returns to the beam shaping prism 106 as the divergent light rays. Thereby, the focus error signal can be detected by the astigmatism method, as in the conventional case.

Figure 14A:
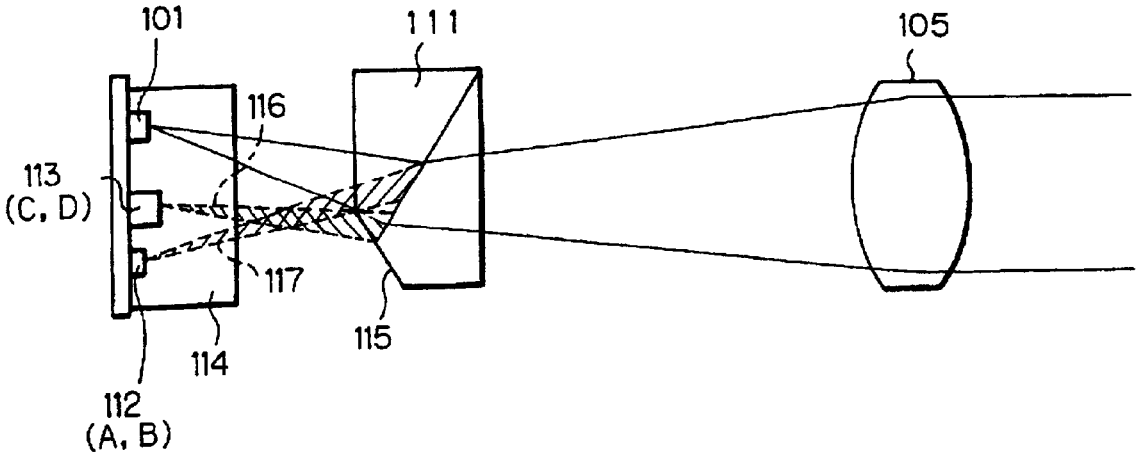
FIGS. 14a through 14c are construction diagrams for explaining the sixth embodiment of the optical pickup apparatus according to the present invention.
Figure 14B:
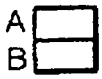
Figure 14C:
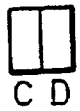

FIGS. 14a through 14c are construction diagrams for explaining the sixth embodiment of the optical pickup apparatus according to the present invention. FIG. 14a is a partly enlarged diagram of FIG. 12a. In FIG. 14a, the reference numeral 111 represents a Wollaston prism (WP), 112 and 113 two-divisional light-receiving elements, 114 a package, 115 a notched portion, and 116, 117 are light rays fluxes. FIG. 14b shows a two-divisional light-receiving element 112. FIG. 14c shows another two-divisional light-receiving element 113.

In FIG. 14, the Wollaston prism (WP) 111 partly provided with the notched portion 115 on the element 104 of FIG. 12. Although the optical system is same as the one of FIG. 12 till reaching the disk, the reflected light rays are divided into two; those are, the light rays flux 116 passing through the partly notched portion 115 and the other light rays flux 17, after the optical path of the reflected light rays is bent by the Wollaston prism (WP) 111. According to the present invention, the light rays flux 117 is employed for performing the focus detection by use of the two-divisional light-receiving element 112, while the light rays flux 116 is employed for performing the track detection by use of the other two-divisional light-receiving element 113 having a divisional line intersecting the two-divisional light-receiving element 112 perpendicularly thereto. The information signal is detected by use of one or both of the added signals of the two-divisional light-receiving element 112 or the other two-divisional light-receiving element 113.

Figure 15:
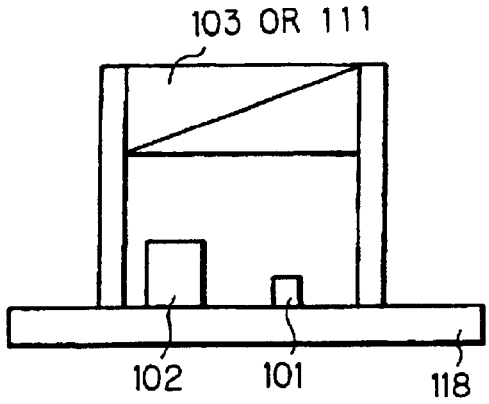
FIG. 15 is a diagram showing the unitarily combined semiconductor laser and light-receiving element according to the present invention.
Figure 16:
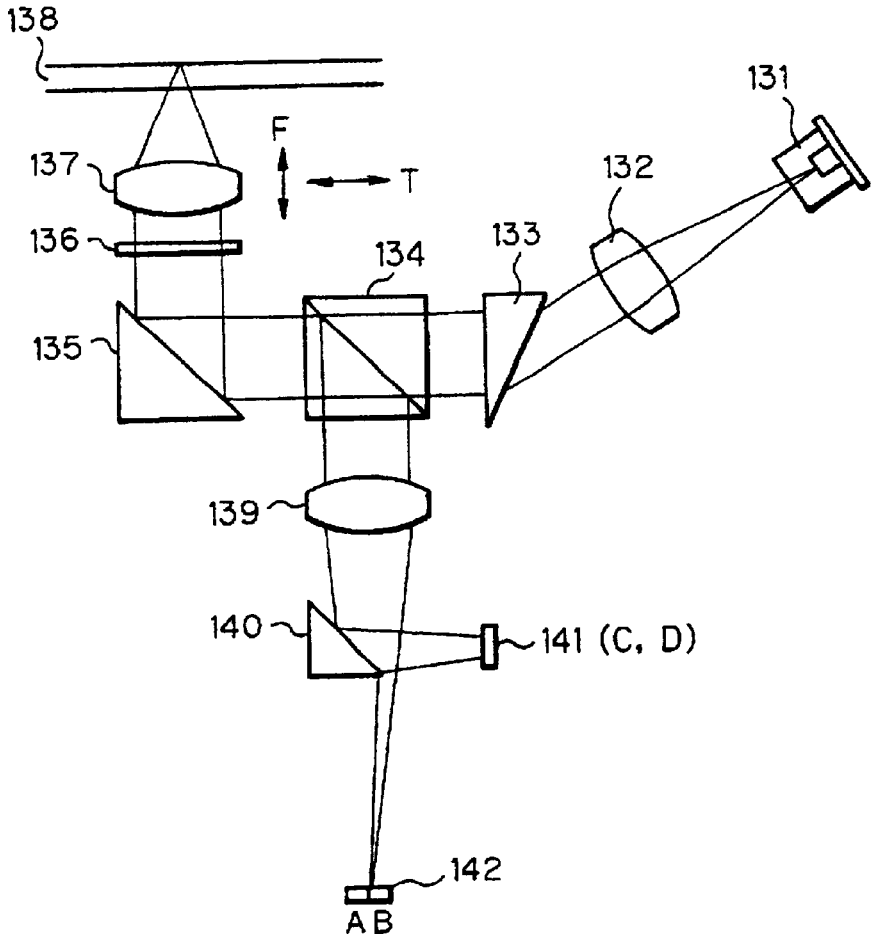
FIG. 16 is a construction diagram for explaining the second example of the conventional optical pickup device.
Figure 17A:
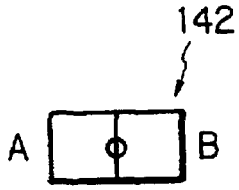
FIGS. 17a through 17c are diagrams showing the focus detecting light-receiving element in FIG. 16.
Figure 17B:
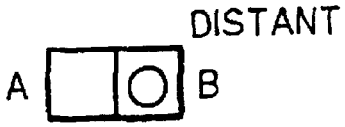
Figure 17C:
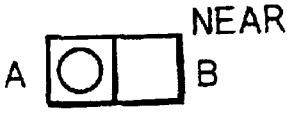
Figure 18:
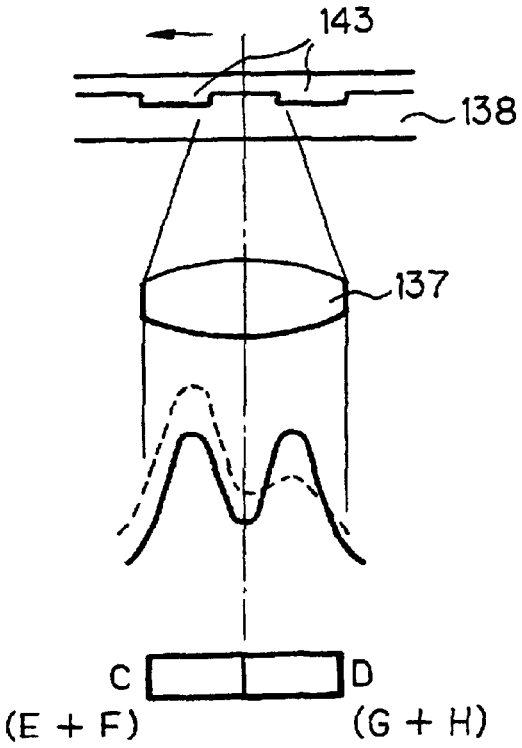
FIG. 18 is a diagram showing the track detecting light-receiving element in FIG. 16.
Figure 19:
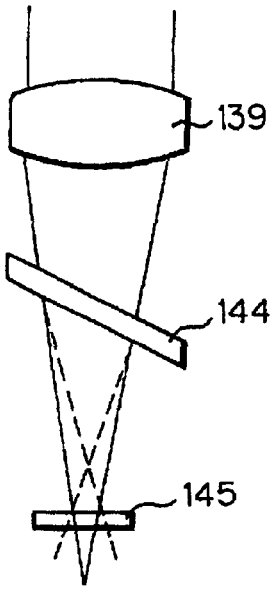
FIG. 19 is a diagram showing the other example of the focus detecting system.
Figure 20A:
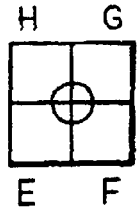
FIGS. 20a through 20c are diagrams showing the state of the focus detecting of the four-divisional light-receiving element in FIG. 19.
Figure 20B:
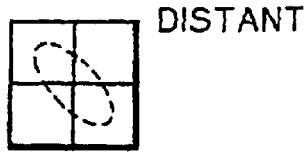
Figure 20C:
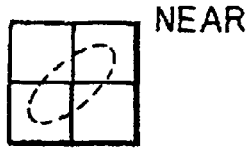
Figure 21:
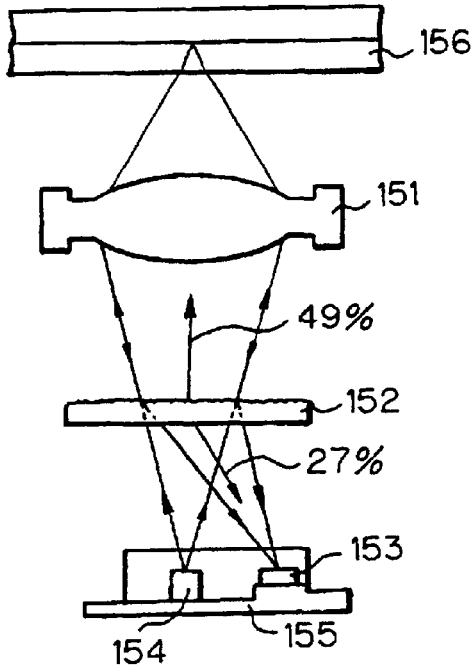
FIG. 21 is a construction diagram for explaining the third example of the conventional optical pickup device.
Figure 22A:
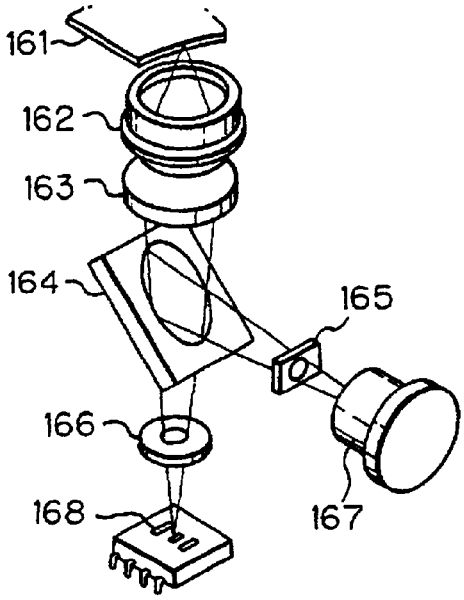
FIGS. 22a and 22b are construction diagrams for explaining the fourth example of the conventional optical pickup device.
Figure 22B:
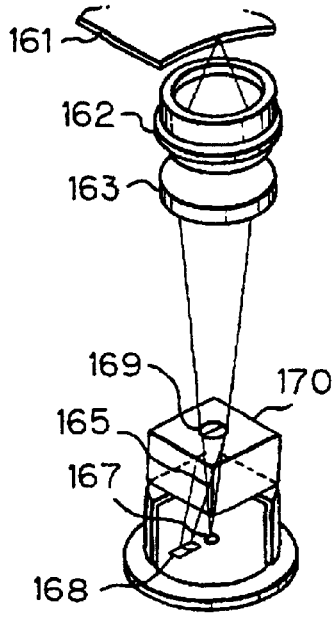

FIG. 15 is a diagram showing the unitarily combined semiconductor laser and light-receiving element according to the present invention. To state more concretely, FIG. 15 shows the optical pickup apparatus in which the semiconductor laser 101 and the light-receiving element 102 (112, 113) unitarily combined with each other on the stem 118 as shown in FIG. 12a and FIG. 14a are sealed up (hermetically sealed) by the uniaxial crystal plate. In such construction, the cost of adjusting and assembling the parts is further reduced and the optical pickup apparatus is further small-sized.

Furthermore, in the sixth embodiment shown in FIGS. 14a through 14c, it is allowed to omit the beam shaping prism 106 shown in FIG. 12a. In the fifth embodiment shown in FIG. 12a, since the astigmatism method detects the not-focused point, the respective heights of the semiconductor laser 101 and the light-receiving element 102 are different from each other. On the other hand, according to the knife-edge method in the sixth embodiment shown in FIG. 14a, since the focus is detected by the focused point and the track is detected by the not-focused point, it is preferable to mount the semiconductor laser 101 and the two-divisional light-receiving element 112 on the same level and it is also preferable to mount the other two-divisional light-receiving element 113 on the different level.

Finally, the functional effects of the embodiments in the second group of the invention are described hereinafter. As is apparent from the foregoing description, according to the present invention, the following effects can be expected:

(1) Effect-1

It is possible to provide an optical pickup apparatus of astigmatism type which is small-sized and employs small number of parts, and the optical pickup apparatus of small light-amount loss can be realized by use of the combination of the uniaxial crystal plate (WP) and the quarter-wave ($\lambda/4$) plate.

(2) Effect-2

In (1), it is possible to provide the technology needed for disposing the semiconductor laser and the light-receiving element in order to accomplish the astigmatism method. (The PD is disposed on the not-focused point).

(3) Effect-3

It is possible to provide the optical pickup apparatus of the knife-edge method which is small-sized and has a small number of employed parts. And further, the optical pickup apparatus of small or zero light amount (intensity) loss can be realized by use of the combination of the uniaxial crystal plate (WP) and the quarter-wave ($\lambda/4$) plate.

(4) Effect-4

In (3), in order to accomplish the knife-edge method, the focus detector and the track detector are respectively disposed on the focused point and on the not-focused point. Thereby, the detection can be done correctly.

(5) Effect-5

In (1) and (3), it is possible to realize further small-sized optical pickup apparatus.

DETAILED DESCRIPTION OF THE PREFERRED EMBODIMENTS IN THE THIRD GROUP OF THE INVENTION

In order to attain the afore-mentioned objects, it is necessary to consider the means for solving the subject matters. In the seventh embodiment of the present invention, in the optical pickup apparatus in which the outgoing light rays emitted from the semiconductor laser are focused by the objective lens and form an extremely small spot on the surface of the optical information recording medium, and in such manner, the operations of recording etc. of the information are performed, and further, the reflection light rays reflected on the afore-mentioned optical information recording medium are guided to the light-receiving element and thereby the reproduction of the information and the detection of the focus error signal and the track error signal both for use in the servo (mechanism) are performed, the quarter-wave ($\lambda/4$) plate and the reflection-type birefringent prism provided with the deflecting function of deflecting the reflection light rays reflected on the above optical information recording medium and the light rays flux separating function of separating the reflected light rays from the outgoing light rays are disposed in the optical path between the semiconductor laser constructing the optical pickup portion and the objective lens, and the light-receiving element for receiving the reflection light rays from the above optical information recording medium which are deflected and separated by the reflection-type birefringent prism is disposed on a single (same) substrate together with the above-mentioned semiconductor laser.

In the eighth embodiment of the present invention, in the optical pickup apparatus in which the outgoing light rays emitted from the semiconductor laser are focused by the objective lens and form an extremely small spot on the surface of the optical information recording medium, and in such manner, the operations of recording, etc. of the information are performed, and further, the reflection light rays reflected on the afore-mentioned optical information recording medium are guided to the light-receiving element and thereby the reproduction of the information and the detection of the focus error signal and the track error signal both for use in the servo (mechanism) are performed, the 3-beam Wollaston prism provided with the light rays flux separating function of separating the reflection light rays from the afore-mentioned optical information recording medium into three polarized components is disposed in the optical path between the semiconductor laser constructing the optical pickup portion and the objective lens, and the above light-receiving element for receiving at least two polarized components among the polarized components separated by the 3-beam Wollaston prism is disposed on a single (same) substrate together with the above-mentioned semiconductor laser.

Regarding the ninth embodiment, all of the optical parts constructing the optical pickup portion from the semiconductor laser to the objective lens are mounted unitarily, in the seventh or eighth embodiment.

Regarding the tenth embodiment, the optical parts constructing the optical pickup portion from the semiconductor laser to the objective lens are accommodated in the movable portion of the actuator which can be moved both in the tracking direction and in the focusing direction, in the seventh, eighth, or ninth embodiment.

Finally, the functional effects of the embodiments in the third group of the invention are described hereinafter. As is apparent from the foregoing description, according to the present invention, the following effects can be expected:

(1) Effect-1 . . . [Seventh Embodiment]

Since the reflection light rays reflected on the optical information recording medium pass through the quarter-wave (λ/4) plate, and are deflected by the reflection-type birefringent prism having both of the deflecting function and the light rays flux separating function, completely separated from the outgoing light rays emitted from the semiconductor laser, and guided to the light-receiving element, it is not necessary to provide separatedly the signal detecting optical system as in the conventional case, and thereby the number of the employed parts can be reduced. Furthermore, since the incident/outgoing surfaces of the reflection-type birefringent prism are plain, there occurs no diffused reflection of the light rays and the prism can execute also the function of preventing the reflection of the light rays. Therefore, such construction can suppress the occurrence of the flaring light rays to the utmost and also reduce the noise occurring on the light-receiving element. Furthermore, since the light-receiving element can be disposed at the side of the semiconductor laser, the space for the optical system can be omitted.

"Flaring Light Rays" signifies the light rays which spread superposing on the image of the object desired to be observed when a part of the light rays are reflected and dispersed in the interior of the optical apparatus.

(2) Effect-2 [Eighth Embodiment]

Since the reflection light rays reflected on the optical information recording medium enter the 3-beam Wollaston prism having the light rays flux separating function of separating the light rays into the respective polarized components as the incident light rays, and are separated into three polarized components, and two polarized components of the light rays among those three components are completely separated from the outgoing light rays emitted from the semiconductor laser, and guided to the light-receiving element, it is not necessary to provide separatedly the signal detecting optical system as in the conventional case, and thereby the number of the employed parts can be reduced. Furthermore, since the incident/outgoing surfaces of the 3-beam Wollaston prism are plain, there occurs no diffused reflection of the light rays and the prism can execute also the function of preventing the reflection of the light rays. Therefore, such construction can suppress the occurrence of the flaring light rays to the utmost and also reduce the noise occurring on the light-receiving element. Furthermore, since the light-receiving element can be disposed at the side of the semiconductor laser, the space for the optical system can be omitted.

(3) [Ninth Embodiment]

Since all of the optical parts constructing the optical pickup portion from the semiconductor laser to the objective lens are mounted unitarily, it is possible to construct the optical pickup which can be further small-sized and operated easily. Furthermore, it is possible to realize an optical system reducing or eliminating the signal variation due to the positional shift between the respective optical parts.

(4) [tenth Embodiment]

Since the optical parts constructing the optical pickup portion from the semiconductor laser to the objective lens are accommodated in the movable portion of the actuator which can be moved both in the tracking direction and in the focusing direction, it is possible to realize the further small-sized and further light-weighted optical pickup portion.

Description of the Concrete Embodiments (Third Group of the Invention)

Figure 23:
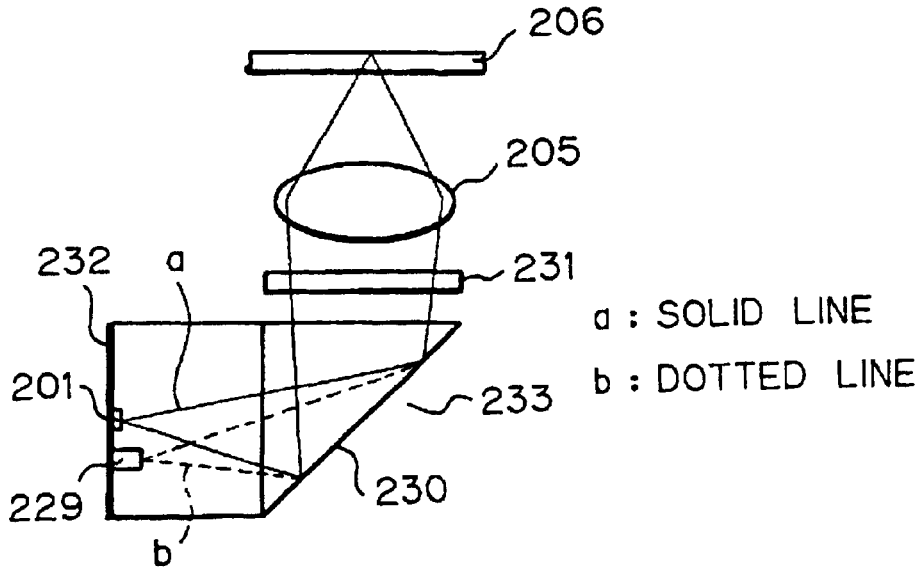
FIG. 23 is a construction diagram for explaining the seventh embodiment of the optical pickup apparatus according to the present invention.
Figure 24:
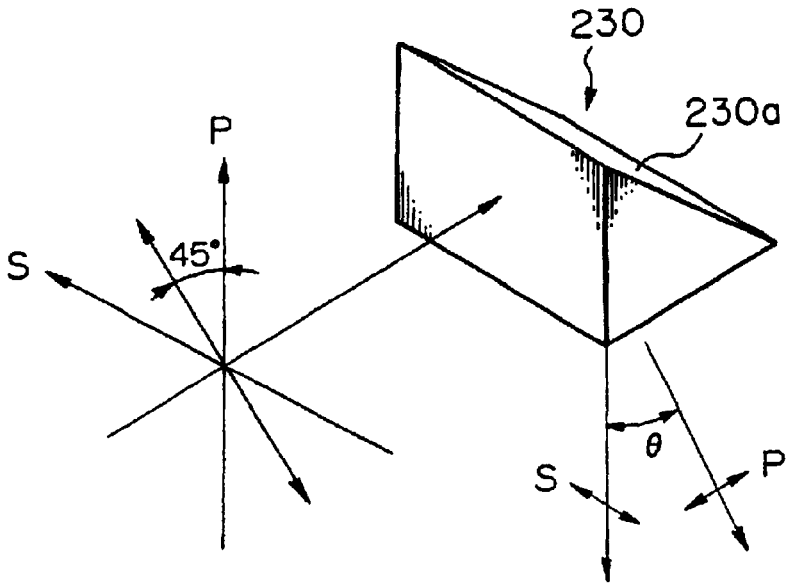
FIG. 24 is a perspective view showing the function of the reflection-type birefringent prism.
Figure 25:
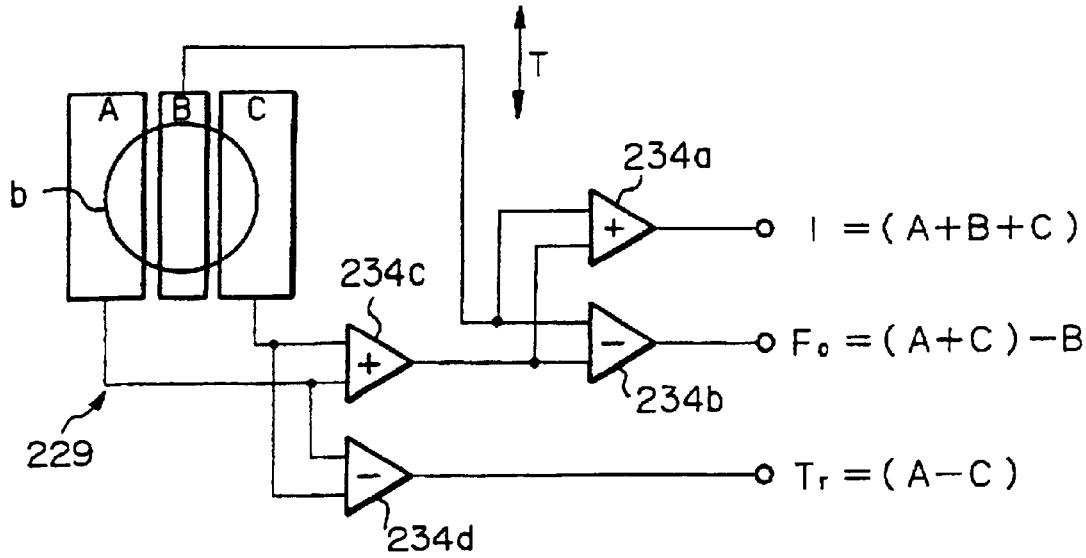
FIG. 25 is a circuit diagram showing the construction of the light-receiving element area.

The seventh embodiment of the present invention is explained, referring to FIGS. 23 through 25. Hereupon, the explanation of the same part as the construction of the fifth through eighth prior-art (conventional) optical pickup devices shown in FIGS. 40 through 43 is omitted, and same reference numeral is attached to the same part.

As shown in FIG. 23, in the seventh embodiment of the present invention, in the optical pickup apparatus in which the outgoing light rays emitted from the semiconductor laser 201 are focused by the objective lens 205 and form an extremely small spot on the surface of the optical disk 206, and in such manner, the operations of recording, etc. of the information are performed, and further, the reflection light rays reflected on the aforementioned optical disk 206 are guided to the light-receiving element 229 and thereby the reproduction of the information and the detection of the focus error signal and the track error signal both for use in the servo (mechanism) are performed, the quarter-wave (λ/4) plate 231 and the reflection-type birefringent prism 230 provided with the deflecting function of deflecting the reflection light rays reflected on the above optical disk 206 and the light rays flux separating function of separating the reflection light rays reflected on the optical disk 206 from the outgoing light rays are disposed in the optical path between the semiconductor laser 201 constructing the optical pickup portion and the objective lens 205, and the light-receiving element 229 for receiving the reflection light rays from the above optical disk 206 which are deflected and separated by the reflection-type birefringent prism 230 is disposed on a single (same) substrate together with the above-mentioned semiconductor laser 201.

As mentioned above, the semiconductor laser 201, the objective lens 205, the reflection-type birefringent prism 230, the quarter-wave (λ/4) plate 231, and the light-receiving element 229 construct the optical pickup portion 233.

FIG. 24 is a perspective view showing the construction and function of the reflection-type birefringent prism 230. As mentioned above, the reflection-type birefringent prism 230 is provided with the light rays flux separating function and the deflecting function.

Concerning the material of the prism 230, it is made of the birefringent substance such as crystallized quartz, calcareous spar, etc. The prism 230 thus constructed has a property of refractive index which differs in accordance with the deflecting direction. When the P-polarized light rays and the S-polarized light rays, both of which are the polarized components, enter the prism 230 through one surface thereof, those light rays are reflected on the slanted surface 230a and emitted from the prism 230 through another surface being separated by the angle θ. Consequently, assuming that the outgoing light rays emitted from the semiconductor laser 201 are the S-polarized ones, the light rays are reflected on the surface of the optical disk 206 and converted to the P-polarized light rays at the time of passing through the quarter-wave (λ/4) plate 231. Since the P-polarized light rays are reflected on the surface of the prism 230, the reflected light rays are separated thereby from the outgoing light rays. At the same time, the operation of deflecting is also done because of changing the optical path by the surface of the prism 230.

Furthermore, reflection preventing films not shown in FIG. 24 are formed on (coat) the incident and outgoing surfaces of the reflection-type birefringent prism 230 through which the light rays beam passes.

The operation of the optical pickup portion 233 employing the reflection-type birefringent prism 230 in such construction is described hereinafter. The outgoing light rays a emitted from the semiconductor laser 201 are reflected on the slanted surface 230a of the reflection-type birefringent prism 230, pass through the quarter-wave (λ/4 ), and are converted from the linearly-polarized light rays to the circularly-polarized light rays. Thereafter, the light rays are focused by the objective lens 205 and form an extremely small spot on the surface of the optical disk 206. Thereby, the operations of recording, erasing, etc. of the information are performed.

And further, regarding the reflection light rays b reflected on the disk surface, the rotational direction of the circular polarization is inversed, and thereafter the light rays pass through the objective lens 205 once again, and the same are converted to the linearly-polarized light rays perpendicular to the direction of the polarization thereof on the forward (outgoing) optical path and enter the reflection-type birefringent prism 230 as the incident light rays. In the reflection-type birefringent prism 230, the reflected light rays b are reflected on the slanted surface 230a of the prism 230, and thereby, on the basis of the functional principle as mentioned before, the light rays are separated from the outgoing light rays a, proceed through the optical path as shown by the dotted line (FIG. 23), and enter the light-receiving element 229 as the incident light rays. The detection of the information signal I, the focus error signal Fo, and the track error signal Tr is performed at this time.

In such manner, the information can be reproduced, and the focusing servo control and the tracking servo control can be done.

FIG. 25 is a circuit diagram showing the construction of the light-receiving element area 229. One example of the method of detecting various signals by use of the light receiving element 229 is described hereinafter. The light-receiving element 229 consists of three-divisional light-receiving surfaces; A, B, and C, divided into three in the track direction T of the disk surface. Various operational elements (adder, subtracter) 234a through 234d are connected to those light-receiving surfaces A, B, and C. On this occasion, since the presence or absence of the mark recorded on the disk surface is detected by the variation of the light intensity of the reflected light rays b, the information signal I can be obtained by the following equality:

$$I=(A+B+C)$$

The focus error signal Fo can be obtained by the following equality, for instance, utilizing the beam size method:

$$Fo=(A+C)-B$$

Thereby, the positional control of the objective lens 205 in the optical axis direction thereof can be performed. The track error signal Tr can be obtained by the following equality, for instance, utilizing the push-pull method:

$$Tr=(A-C)$$

Thereby, the positional control of the objective lens 205 in the radial direction thereof can be performed.

As mentioned heretofore, since the reflection light rays b reflected on the optical disk 6 are guided to the reflection-type birefringent prism 230 having both functions of separating the light rays flux and deflecting the same and reflected thereon, and further guided to the light-receiving element 229 in a state of being completely separated from the outgoing light rays a, it is not necessary to separatedly prepare the signal detecting optical system 207 as in the case of the conventional manner, and thereby the reduction of the employed parts number and the cost-down of the optical pickup can be realized.

Furthermore, both of the incident and outgoing surfaces of the reflection-type birefringent prism 230 are plain, there occurs no diffused reflection, and further it is possible to suppress the flaring light rays to the utmost and reduce the noise in the light-receiving element 229 by forming the reflection preventing film on the surfaces of the prism 230. Thereby, the signal detection can be done with good S/N. And further, by disposing the light-receiving element 229 at the side of the semiconductor laser 201, the space for the optical system can be omitted. Consequently, it is possible to provide a small-sized and light-weighted optical pickup apparatus and perform the high-speed seeking operation.

Nextg, the eighth embodiment of the present invention is explained referring to FIGS. 26 through 34. The explanation of the same portion as that of the afore-mentioned seventh embodiment is omitted, and same reference numeral is attached to the same portion.

Figure 26:
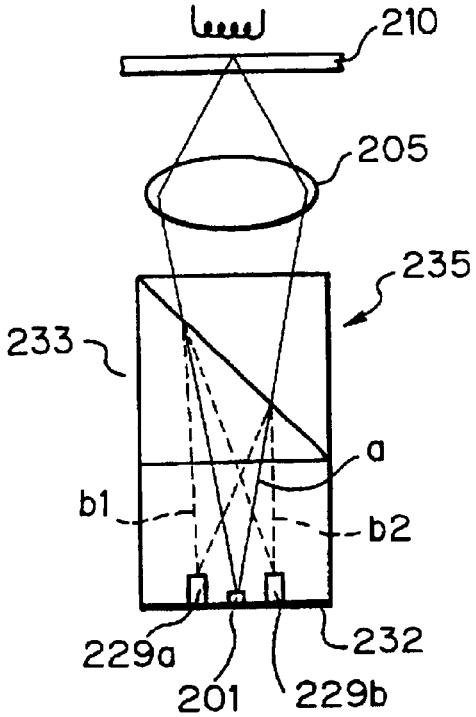
FIG. 26 is a construction diagram for explaining the eighth embodiment of the optical pickup apparatus according to the present invention.

In the optical pickup apparatus of the eighth embodiment as shown in FIG. 26, a 3-beam Wollaston prism 235 provided with the light rays flux separating function of separating the reflection light rays from the magneto-optic disk 210 employed as the optical information recording medium into three polarized components is disposed in the optical path between the semiconductor laser 201 and the objective lens 205, and the light-receiving elements 229a and 229b receiving at least two polarized components among the polarized components separated by the 3-beam Wollaston prism 235 are unitarily mounted on the same substrate 232 together with the semiconductor laser 201.

As mentioned above, the semiconductor laser 201, the objective lens 205, the 3-beam Wollaston prism 235, and the light-receiving elements 229a and 229b construct the optical pickup portion 233.

Figure 27:
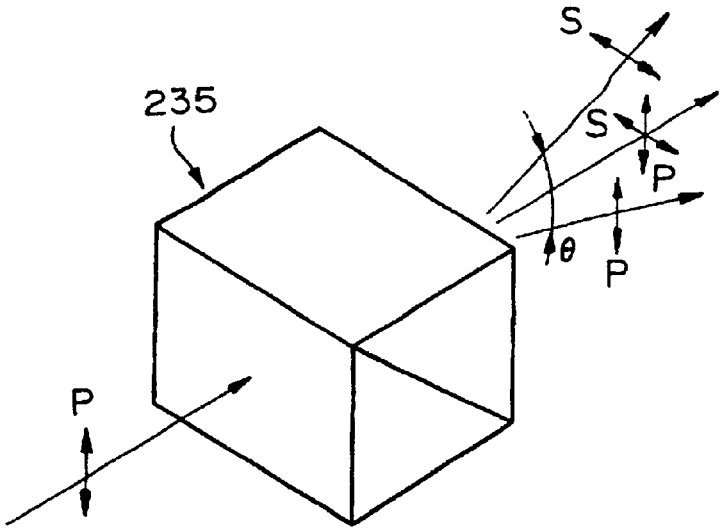
FIG. 27 is a perspective view showing the function of the 3-beam Wollaston prism.
Figure 28:
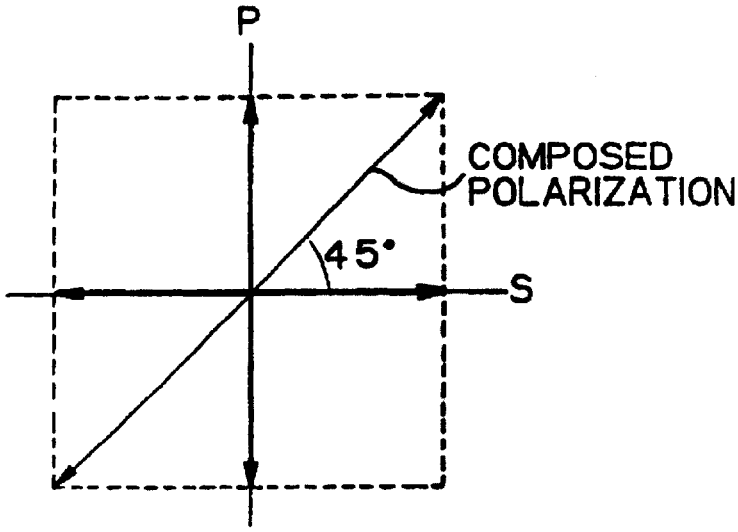
FIG. 28 is an explanatory diagram showing the state of composing the P-polarized component and the S-polarized component.

FIG. 27 is a perspective view showing the construction and its function of the 3-beam Wollaston prism 235. The 3-beam Wollaston prism 235 is constructed with the combination of the birefringent crystal, and the directions of the optical axes of each crystal differ from each other. On this occasion, for instance, the P-polarized light rays entering one surface of the 3-beam Wollaston 235 as the incident light rays are divided into three beams; those are, the P-polarized light rays beam, the S-polarized light rays beam, and the P(S)- polarized light rays beam. The P-polarized light rays entering the surface of the prism 235 are the polarized light rays vibrating in the direction of 45° to the respective polarized light rays, as shown in FIG. 28.

Furthermore, reflection preventing films not shown in FIG. 27 are formed on (coat) the incident and outgoing surfaces of the 3-beam Wollaston prism 235 through which the light rays beam passes.

The operation of the optical pickup portion 233 employing the 3-beam Wollaston prism 235 in such construction is described hereinafter, referring to FIG. 26. The outgoing light rays a emitted from the semiconductor laser 201 pass through the 3-beam Wollaston prism 235, are focused by the objective lens 205, and form an extremely small spot on the surface of the magneto-optic disk 210 employed as the optical information recording medium. Thereby, the operations of recording and erasing the information on the disk 210 are performed.

The operation of recording is done on the magneto-optic disk 210 in accordance with the polarity of the magnetizing direction on the surface of the magneto-optic disk. The light rays reflected on the surface of the magneto-optic disk 210 pass through the objective lens 205, and are divided into three polarized components by the 3-beam Wollaston prism 235. Two polarized components $b_1$ and $b_2$ among those three components enter the light-receiving elements 229a and 229b as the incident light rays.

When the linearly-polarized light rays are reflected on the surface of the magneto-optic disk 210, the polarization surface there of is rotated and the direction of its rotation varies in accordance with the direction of the magnetization (Kerr Effect). At this time, the information signal (magneto-optic signal) can be reproduced, utilizing the difference of the rotational direction of the polarizing surface. And further, the focus error signal Fo and the track error signal Tr can be detected, utilizing the method as mentioned in the previous (seventh) embodiment. (Refer to FIG. 25.)

The definition of the magneto-optic Kerr effect is mentioned below in brief. When the light rays enter the optical substrate as the incident light rays, the polarizing state (condition) and the reflection factor vary in accordance with the state of magnetization. Such phenomenon is called the "Kerr effect".

Figure 29:
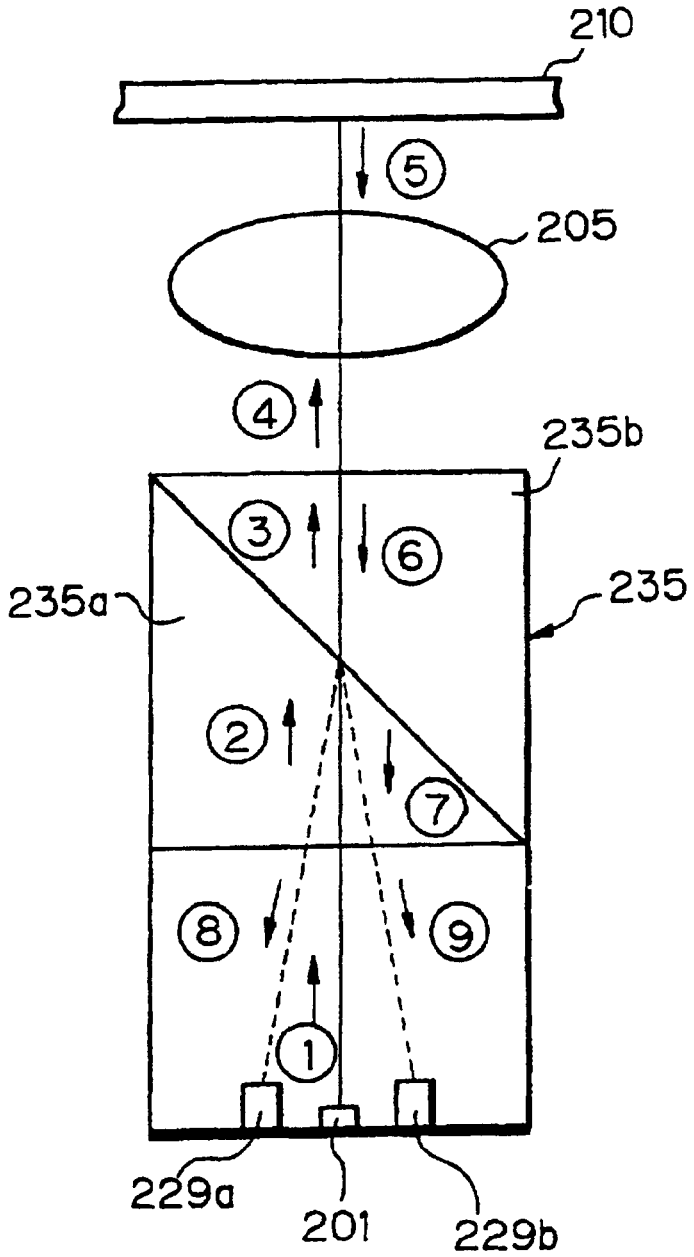
FIG. 29 is an explanatory diagram showing the proceeding state of the polarizing component of the respective parts.

Next, the case of detecting the information signal (magneto-optic signal) is explained referring to FIGS. 29 through 34, focusing on the action of the light rays in the 3-beam Wollaston prism 235. The numerals ① through ⑨ in FIG. 29 show, separatedly, the order of the light rays proceeding on the optical path from reflecting the outgoing light rays a emitted from the semiconductor laser 201 on the surface of the magneto-optic disk 210 till guiding the reflected light rays to the light-receiving elements 229a and 229b. The order of the light rays proceeding "① to ⑨" is described hereinafter. Assume that the 3-beam Wollaston prism 235 consists of the prisms 235a and 235b. At first, the numeral ① of FIG. 30a shows the component of the P-polarized light rays which are the outgoing light rays a emitted from the semiconductor laser 201. The action of the P-polarized light rays is explained below. The numeral ② of FIG. 30b shows the state in the prism 235a. The P-polarized light rays are divided into the ordinary light rays 236 and the extraordinary light rays 237 to the compass direction (cource) L of the optical axis.

Figure 30A:
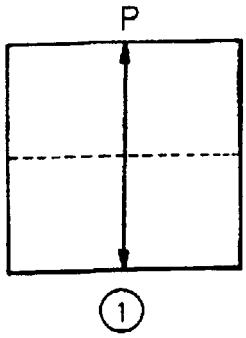
FIGS. 30a through 30e are explanatory diagrams showing the polarizing state from the time of emitting the outgoing light rays till the time of passing through the prism.
Figure 30B:
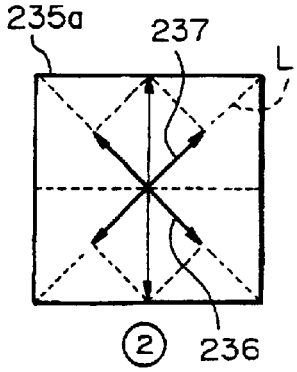
Figure 30C:
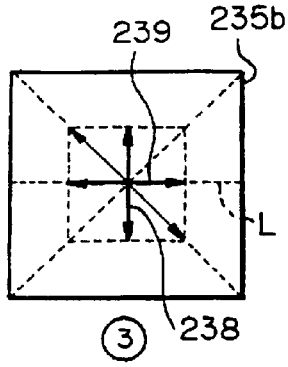

On the other hand, the numeral ③ of FIG. 30c shows the state in the prism 235b. The P-polarized light rays are divided into the ordinary light rays 238 and the extraordinary light rays 239 to the compass direction (course) L of the optical axis.

The P-polarized light rays pass through ② and ③, and act as follows:

1) In case that the light rays are ordinary at ② and are also ordinary at ③, the light rays go straight.
2) In case that the light rays are extraordinary at ② and are also extraordinary at ③, the light rays also go straight.
3) In case that the light rays are ordinary at ② and are extraordinary at ③, the light rays do not go straight. Instead, the light rays are refracted.
4) In case that the light rays are extraordinary at ② and are ordinary at ③, the light rays do not go straight. Instead, the light rays are refracted.

Figure 30D:
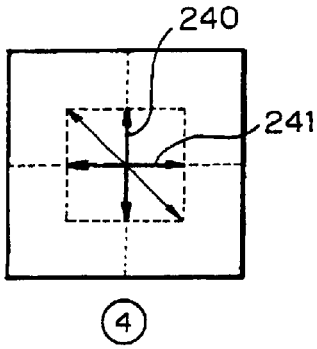
Figure 30E:
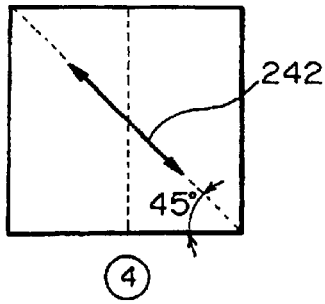

Regarding the subsequent forward optical path, only the straight-going light rays are explained. The numeral ④ of FIG. 30d represents the component of the light rays 240 which are ordinary both at ② and ③ and the component of the light rays 241 which are extraordinary both at ② and ③. The numeral ④ of FIG. 30e represents the light rays 242 composing both of the components of those two light rays 240 and 241.

Figure 31A:
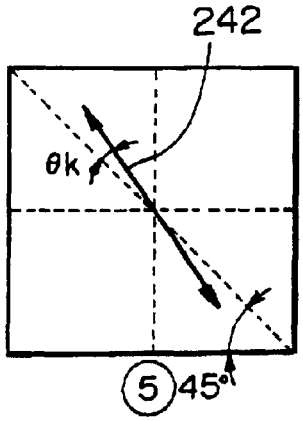
FIGS. 31a through 31d are explanatory diagrams showing the state of polarizing from the time of reflecting the reflection light rays on the disk surface till the time of entering one surface of the prism as the incident light rays, by individually separating them in the direction of magnetization.
Figure 31B:
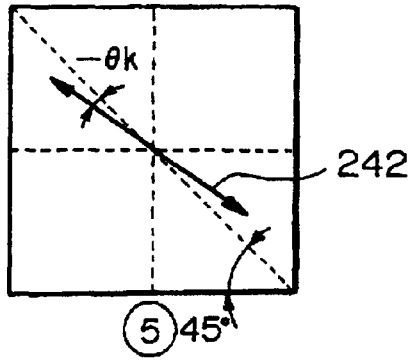

The numeral ⑤ of FIGS. 31a and 31b shows the state of the light rays 242 after being reflected on the magneto-optic disk 210 in the both cases of the positive and negative magnetizing directions (←,→).

Figure 31C:
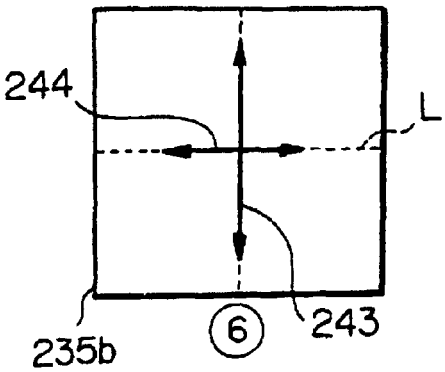
Figure 31D:
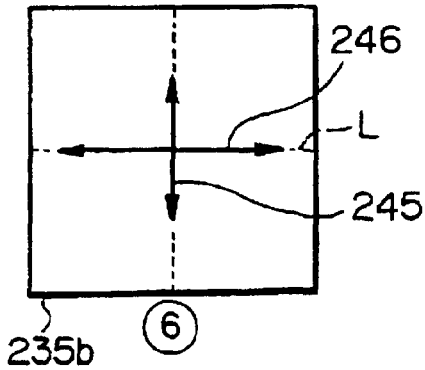

FIG. 31a shows the state of the light rays rotated in the plus (+) direction by the Kerr rotational angle, $\theta_k$ on the magneto-optic disk surface. FIG. 31b shows the state of the light rays rotated in the minus (−) direction by the Kerr rotational angle $\theta_k$ thereon. The numeral ⑥ of FIGS. 31c and 31d shows, respectively, the states of the light rays 242 shown in FIGS. 31a and 31b at the time of entering the prism 235b once again as the incident light rays. Namely, when the light rays 242 shown in FIG. 31a enter the prism 235b as the incident light rays, the ordinary light rays 243 and the extraordinary light rays 244 as shown in FIG. 31c occur (come into existence) to the compass direction (course) L of the optical axis. On the other hand, when light rays 242 shown in FIG. 31b enter the prism 235b, the ordinary light rays 245 and the extraordinary light rays 246 as shown in FIG. 31d occur (come into existence) to the compass direction (course) L of the optical axis.

The numeral ⑥ of FIGS. 32a through 32d shows the action of the light rays 243 through 246 shown in FIGS. 31c and 31d in the prism 235b, separatedly, for the ordinary light rays and the extraordinary light rays.

Figure 32A:
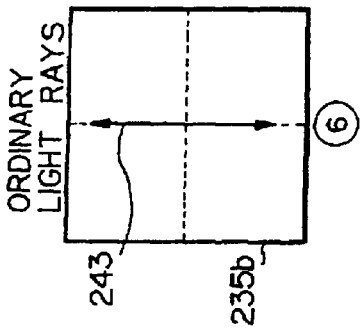
FIGS. 32a through 32h are explanatory diagrams showing the state of polarizing of the ordinary light rays and the extraordinary light rays of the reflected light rays in the prism, by individually separating them in the direction of magnetization.
Figure 32B:
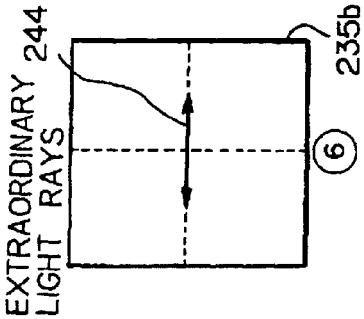
Figure 32C:
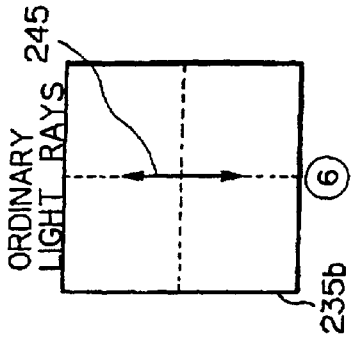
Figure 32D:
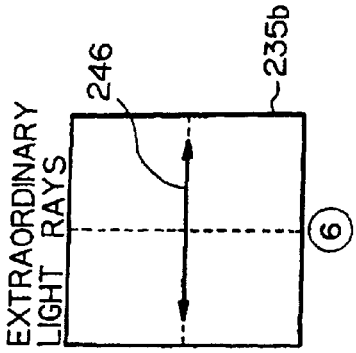
Figure 32E:
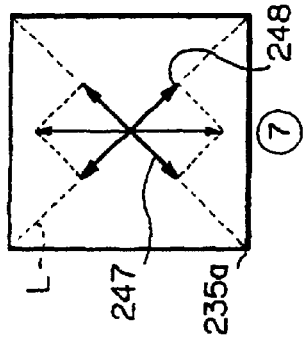
Figure 32F:
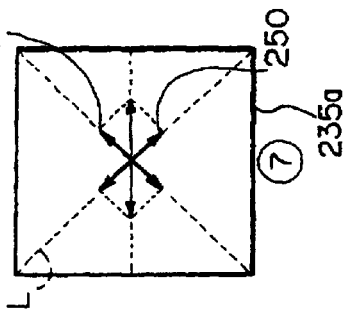
Figure 32G:
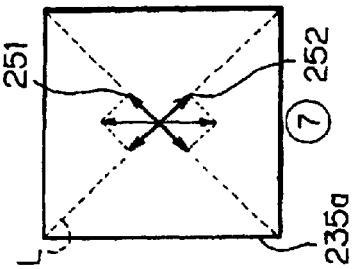
Figure 32H:
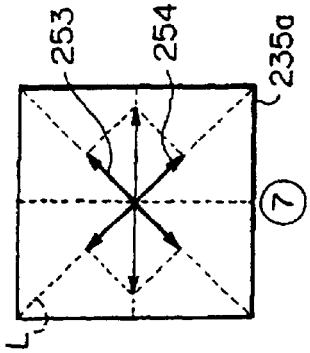

The numeral ⑦ of FIGS. 32g through 32h shows the actions of the respective light rays 243 through 246 shown in FIGS. 32a through 32d at the time of entering the prism 235a. Namely, the ordinary light rays 243 shown in FIG. 32a are divided into the ordinary light rays 247 and the extraordinary light rays 248 to the compass direction (course) L of the optical axis as shown in FIG. 32e. The ordinary light rays 244 shown in FIG. 32b are divided into the ordinary light rays 249 and the extraordinary light rays 250 to the compass direction (course) L of the optical axis as shown in FIG. 32f. The ordinary light rays 245 shown in FIG. 32c are divided into the ordinary light rays 251 and the extraordinary light rays 252 to the compass direction (course) L of the optical axis as shown in FIG. 32g. The ordinary light rays 246 shown in FIG. 32d are divided into the ordinary light rays 253 and the extraordinary light rays 254 to compass direction (course) L of the optical axis as shown in FIG. 32h.

Figure 33A:
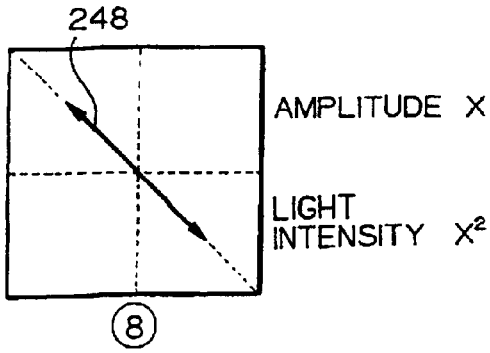
FIGS. 33a through 33d are explanatory diagrams showing the polarized component detected by two light-receiving elements, by individually separating them in the direction of magnetization.
Figure 33B:
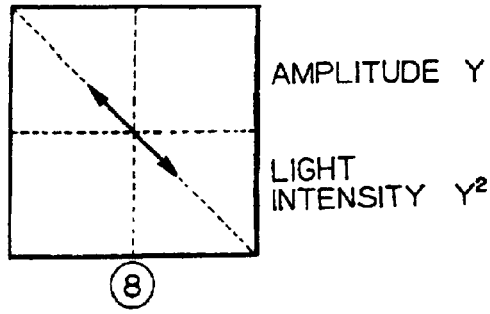
Figure 33C:
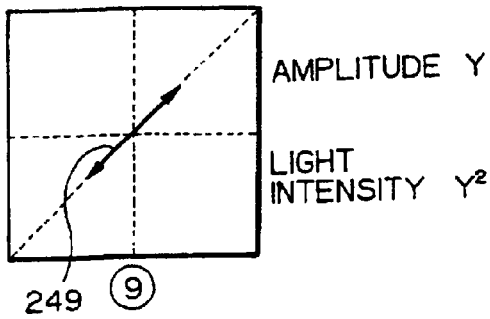
Figure 33D:
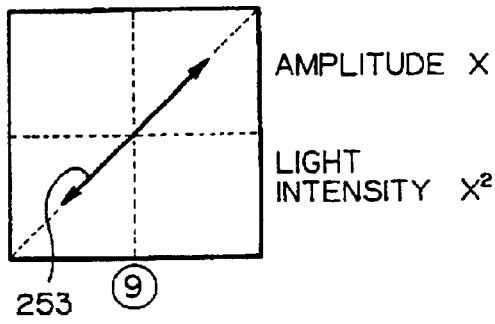

The numeral ⑧ of FIGS. 33a and 33b shows the action of the light rays guided to the light-receiving element 229a, and the numeral ⑨ of FIGS. 33c 33d shows the action of the light rays guided to the light-receiving element 229b. Namely, the light rays refracted on the boundary surface portion between the prism 235b and the prism 235a and entering the light-receiving element 229a are the ordinary light rays 243 and 245 in the prism 235b, and the same are the extraordinary light rays 248 and 252 in the prism 235a, as shown in FIGS. 33a and 33b.

On the other hand, the light rays refracted on the boundary surface portion between the prism 235b and the prism 235a and entering the light-receiving element 229b are the extraordinary light rays 244 and 246 in the prism 235b, and the same are the ordinary light rays 249 and 253 in the prism 235a, as shown in FIGS. 33c and 33d. By the action ①–⑨ as mentioned above, the outgoing light rays which are the P-polarized light rays turn out to be detected by the light-receiving elements 229a and 229b.

The information signal can be obtained by the difference signal between the signal detected by the light-receiving element 229a and the other signal detected by the light-receiving element 229b.

Figure 34A:
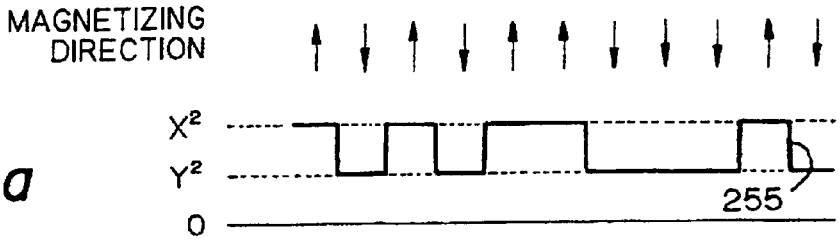
FIGS. 34a through 34c are waveform diagrams showing the output waveform of the signal detected by the light-receiving element.
Figure 34B:
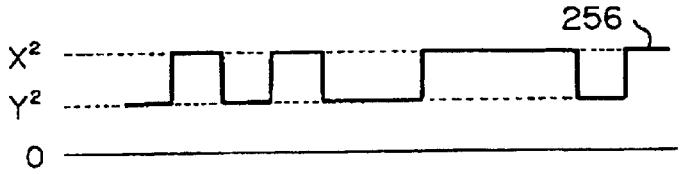
Figure 34C:
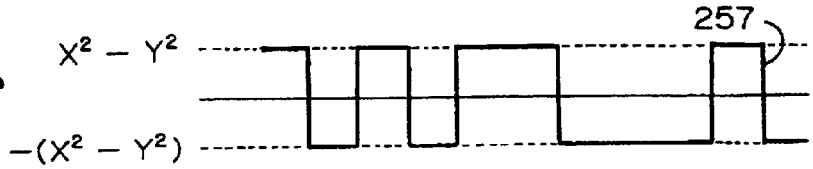

FIG. 34a shows the output waveform 255 of the signal detected by the light-receiving element 229a, and FIG. 34b shows the output waveform 256 of the other signal detected by the light-receiving element 229b. The information signal represented by the output waveform 257 as shown in FIG. 34c can be obtained from the differential value of those two signals.

In such manner, the signal detection is performed with the differential value method by use of the 3-beam Wollaston prism 235. Consequently, the noise of the same-phase components of the respective light-receiving elements 229a and 229b can be reduced, and in addition, it is possible to obtain the output signal of the value two times of the respective signals individually detected by the light-receiving elements 229a and 229b. Therefore, the reproduction of good S/N can be done.

As mentioned above, the reflection light rays reflected on the magneto-optic disk 210 enter the 3-beam Wollaston prism 235 as the incident light rays, and are separated into three poloarized components of the light rays. Two polarized components of the light rays among three polarized components are completely separated from the outgoing light rays and are guided to the light-receiving elements 229a and 229b. Since the 3-beam Wollaston prism 235 having the light rays flux separating function of separating into the polarized components in such manner is employed, it is not necessary to provided, separatedly, the signal detecting optical system as in the conventional case, and thereby the cost-down of the optical pickup apparatus can be realized by reducing the number of the employed parts. Furthermore, since the incident and outgoing surfaces of the 3-beam Wollaston prism 235 are plain, the diffused reflection does not occur. And further, by forming the reflection preventing film, the occurrence of the flaring light rays can be suppressed to the utmost, and the noise on the light-receiving elements 229a and 229b can be reduced. Thereby, the signal detection with good S/N can be done. Furthermore, since the light-receiving elements 229a and 229b can be disposed at the side of the semiconductor laser 201, the space for the optical system can be omitted and thereby the small-sized and light-weighted construction of the optical pickup can be realized and the seeking operation can be done with high speed.

Next, the ninth embodiment of the present invention is explained referring to FIGS. 35 through 38. The explanation of the same portion as that of the seventh and eighth embodiments is omitted, and same reference numeral is attached to the same portion.

In the optical pickup apparatus described in the seventh and eighth embodiments, all of the optical parts constructing the optical pickup portion 233 from the semiconductor laser 201 to the objective lens 205 are unitarily mounted. FIGS. 35 through 38 show the concrete examples of the pickup construction.

Figure 35:
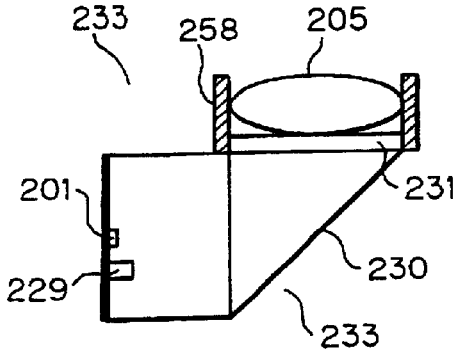
FIG. 35 is a construction diagram for explaining the ninth embodiment of the optical pickup apparatus according to the present invention relating to the optical pickup portion employing the lens holder.

FIG. 35 shows an example of unitarily combining the optical pickup portion 233 of the optical pickup apparatus described in the seventh embodiment. (Refer to FIG. 23.) On this occasion, the quarter-wave (λ/4) plate 231 is bonded to one surface of the reflection-type birefringent prism 230 with adhesive agents, and the quarter-wave (λ/4) plate 231 and the objective lens 205 are held by the lens holder 258. In such construction, all of the optical pickup portion 233 can be mounted unitarily.

Figure 36:
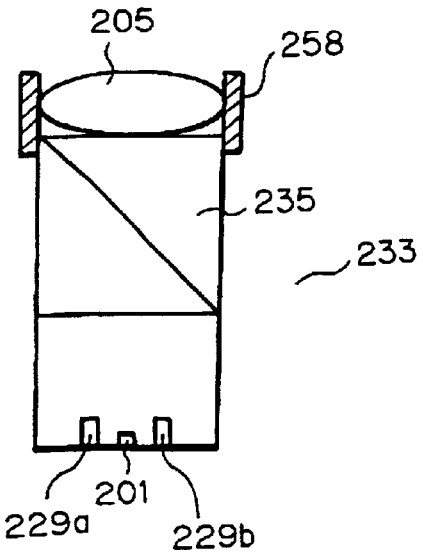
FIG. 36 is a construction diagram showing the other example of assembling by use of the lens holder.

FIG. 36 shows an example of unitarily combining the optical pickup portion 233 of the optical pickup apparatus described in the eighth embodiment. (Refer to FIG. 26.) On this occasion, the objective lens 205 is disposed on one surface of the 3-beam Wollaston prism 235, and those two optical parts are held by the lens holder 258. In such construction, all of the optical pickup portion 233 can be mounted unitarily.

Figure 37:
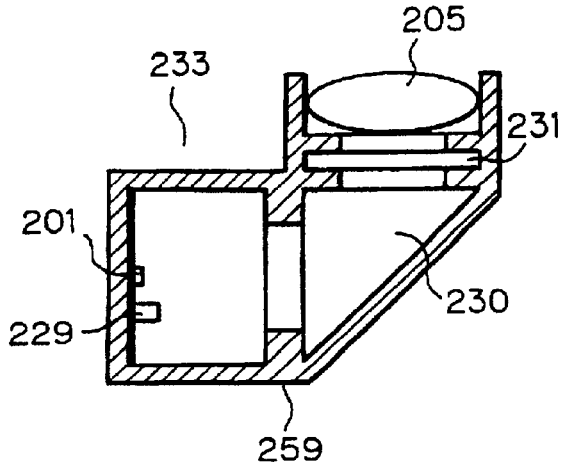
FIG. 37 is a construction diagram showing the example of assembling by use of the optical parts holder.
Figure 38:
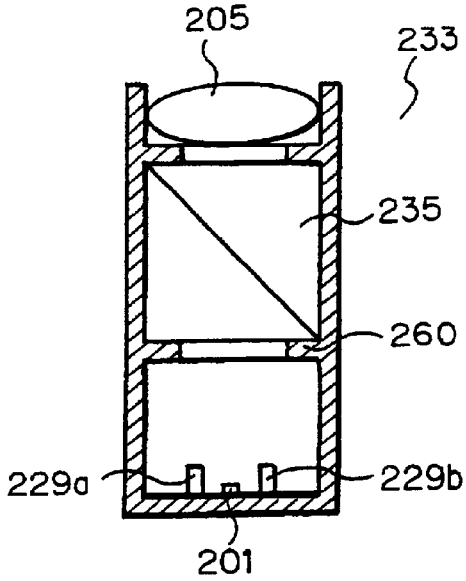
FIG. 38 is a construction diagram showing the other example of assembling by use of the optical parts holder.

FIG. 37 shows an example of unitarily mounting all of the optical parts constructing the optical pickup portion 233 by use of the optical parts holer 259, instead of the lens holder 258 shown in FIG. 35. FIG. 38 shows an example of unitarily mounting all of the optical parts constructing the optical pickup portion 233 by use of the optical parts holder 260, instead of the lens holder 258 shown in FIG. 36.

As mentioned above, the boundary portions of almost all optical parts excluding the objective lens 205 are fixed by bonding with adhesive agents and unitarily mounted by use of the lens holder 258, or those parts are unitarily mounted by use of the optical parts holders 259 and 260. In such manner, an extremely compact construction can be realized. Furthermore, it is possible to realize an optical system of small signal variation due to the slippage of respective parts which can be handled easily.

Figure 39:
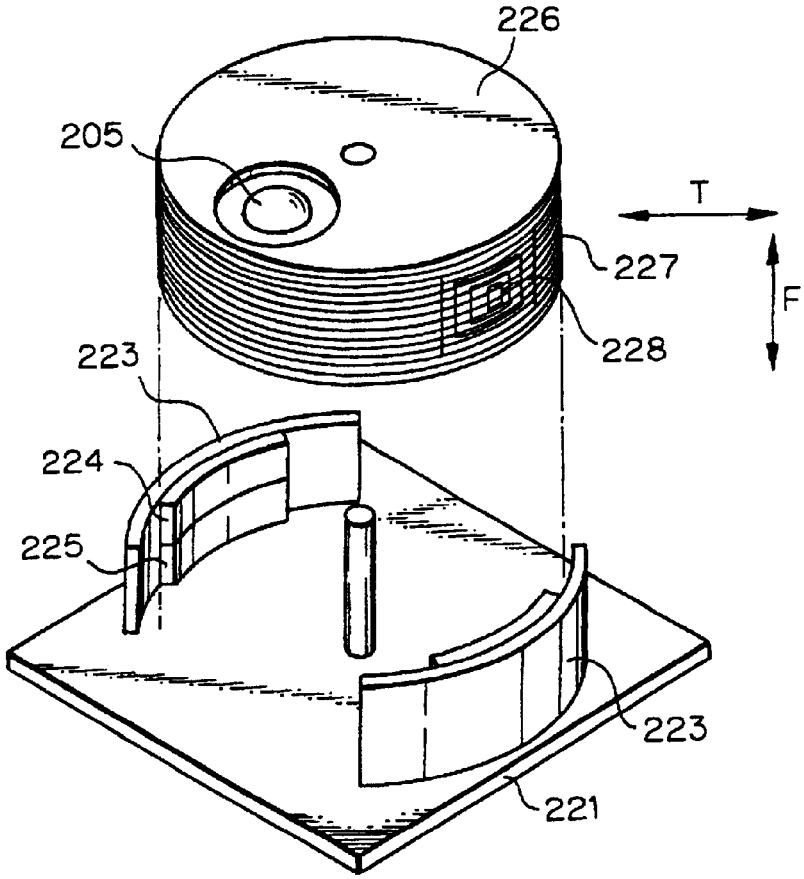
FIG. 39 is a construction diagram for explaining the tenth embodiment of the optical pickup apparatus according to the present invention relating to the optical pickup portion accommodated in the actuator's movable portion.
Figure 40:
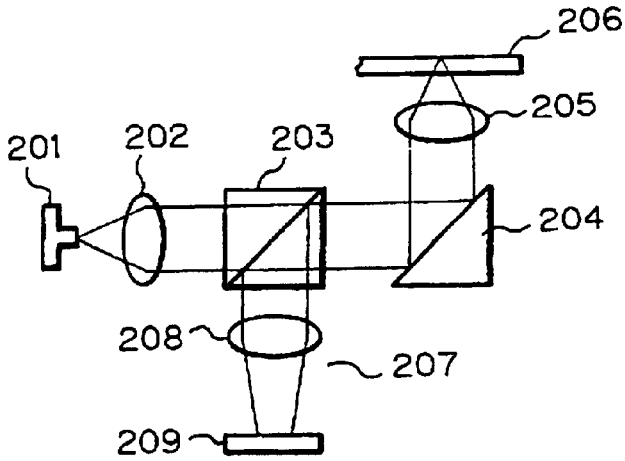
FIG. 40 is a construction diagram for explaining the fifth example of the conventional optical pickup device.
Figure 41:
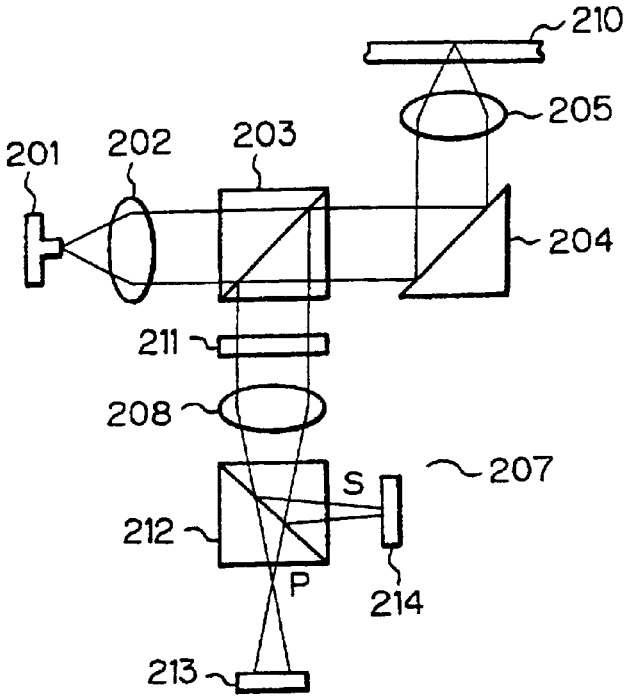
FIG. 41 is a construction diagram for explaining the sixth example of the conventional optical pickup device.
Figure 42:
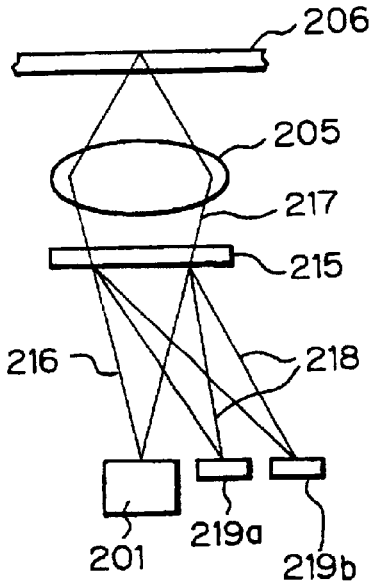
FIG. 42 is a construction diagram for explaining the seventh example of the conventional optical pickup device.

Next, the tenth embodiment of the present invention is explained referring to FIG. 39. The explanation of the same portion as that of the seventh through ninth embodiments is omitted, and same reference numeral is attached to the same portion.

The tenth embodiment is the one, to which the optical pickup apparatuses described in the seventh through ninth embodiments are applied on the basis of a part of the construction regarding the afore-mentioned eighth example of the conventional optical pickup device. (Refer to FIG. 43.) Namely, in the optical pickup apparatuses described in the seventh through ninth embodiments, the optical parts constructing the optical pickup portion 233 from the semiconductor laser 201 to the objective lens 205 are accommodated in the actuator's movable portion 226 which can be moved in the tracking direction T and the focusing direction F.

Figure 43:
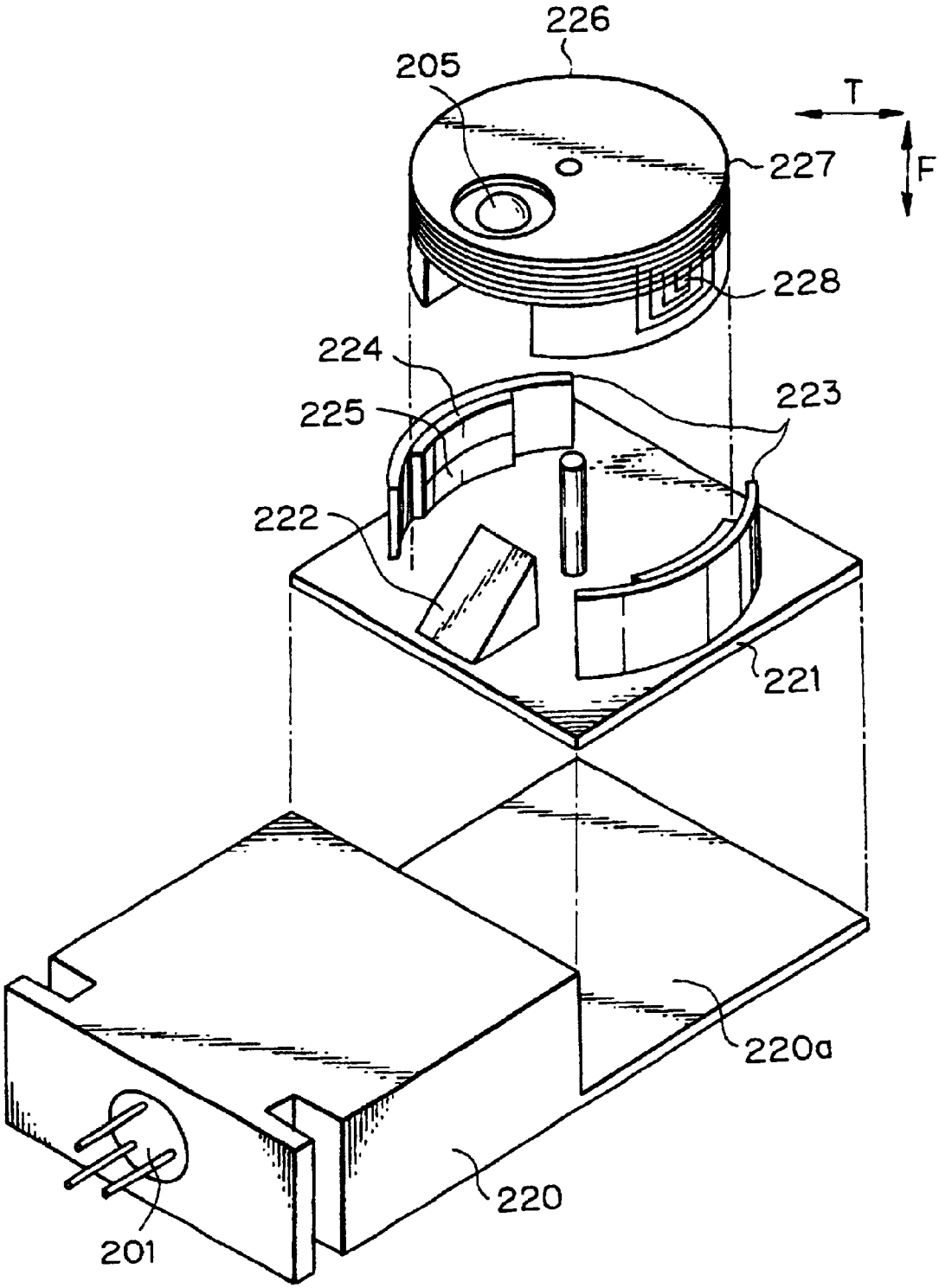
FIG. 43 is a construction diagram (perspective view) for explaining the eighth example of the conventional optical pickup device.

To state more concretely, the optical pickup portion 233 in FIG. 23, FIG. 35, and FIG. 37 or the optical pickup portion 233 in FIG. 26, FIG. 36, and FIG. 38 is accommodated in the actuator's movable portion 226 shown in FIG. 39. In such construction, it is not necessary to prepare the optical pickup housing 220 as shown in FIG. 43. Therefore, the light-weighted and small-sized optical pickup apparatus can be realized.

Finally, the functional effects of the embodiments in the third group of the invention are described hereinafter. As is apparent from the foregoing description, according to the present invention, the following effects can be expected:

Regarding the seventh embodiment of the present invention, in the optical pickup apparatus in which the outgoing light rays emitted from the semiconductor laser are focused by the objective lens and form an extremely small spot on the surface of the optical information recording medium, and in such manner, the operations of recording, etc. of the information are performed, and further the reflection light rays reflected on the afore-mentioned optical information recording medium are guided to the light-receiving element and thereby the reproduction of the information and the detection of the focus error signal and the track error signal both for use in the servo (mechanism) are performed, the quarter-wave ($\lambda/4$) plate and the reflection-type birefringent prism provided with the deflecting function of deflecting the reflection light rays reflected on the above optical information recording medium and the light rays flux separating function of separating the reflected light rays from the outgoing light rays are disposed in the optical path between the semiconductor laser constructing the optical pickup portion and the objective lens, and the light-receiving element for receiving the reflection light rays from the above optical information recording medium which are deflected and separated by the reflection-type birefringent prism is disposed on a single (same) substrate together with the above-mentioned semiconductor laser.

In such construction, since the reflection-type birefringent prism having both of the deflecting function and the light rays flux separating function is employed, it turns out to become unnecessary to separatedly prepare the signal detecting optical system as in the conventional case, and thereby the cost-down can be realized by reducing the number of the employed parts. And further, since the incident and outgoing surfaces of the reflection-type birefringent prism are plain, there occurs no diffused reflection of the light rays and the incident and outgoing surface serve also as the one for preventing the reflection. Consequently, the occurrence of the flaring light rays can be suppressed to the utmost and the noise on the light-receiving element can be reduced. Thereby the signal detection with good S/N can be performed. And further since the light-receiving element can be disposed at the side of the semiconductor laser, the space for the optical system can be omitted. Thereby, it is possible to realize the small-sized and light-weighted construction of the optical pickup, and further the high-speed seeking operation can be done.

Regarding the eighth embodiment of the present invention, in the optical pickup apparatus in which the outgoing light rays emitted from the semiconductor laser are focused by the objective lens and form an extremely small spot on the surface of the optical information recording medium, and in such manner, the operations of recording, etc. of the information are performed, and further the reflection light rays reflected on the afore-mentioned optical information recording medium are guided to the light-receiving element and thereby the reproduction of the information and the detection of the focus error signal and the track error signal both for use in the servo (mechanism) are performed, the 3-beam Wollaston prism provided with the light rays flux separating function of separating the reflection light rays reflected on the optical information recording medium into three polarized components is disposed in the optical path between the semiconductor laser constructing the optical pickup portion and the objective lens, and the light-receiving element for receiving the at least two polarized components among the three polarized components separated by the 3-beam Wollaston prism is disposed on a single (same) substrate together with the above-mentioned semiconductor laser.

In such construction, since the 3-beam Wollaston prism having the light rays flux separating function of separating the flux into the polarized components is employed, it turns out to become unnecessary to separatedly prepare the signal detecting optical system as in the conventional case, and thereby the cost-down can be realized by reducing the number of the employed parts. And further since the incident and outgoing surfaces of the 3-beam Wollaston prism are plain, there occurs no diffused reflection of the light rays and the incident and outgoing surfaces serve also as the one for preventing the reflection. Consequently, the occurrence of the flaring light rays can be suppressed to the utmost and the noise on the light-receiving element can be reduced. Thereby the signal detection with good S/N can be performed. And further, since the light-receiving element can be disposed at the side of the semiconductor laser, the space for the optical system can be omitted. Thereby, it is possible to realize the small-sized and light-weighted construction of the optical pickup, and further, the high-speed seeking operation can be done.

Regarding the ninth embodiment, in the seventh or eighth embodiment, since all of the optical parts constructing the optical pickup portion from the semiconductor laser to the objective lens are mounted unitarily, it is possible to realize the extremely small-sized construction of the optical pickup which can be handled easily. Furthermore, it is possible also to realize an optical system of small signal variation due to the slippage of respective parts.

Regarding the tenth embodiment, in the seventh, eighth or ninth embodiment, since the optical parts constructing the optical pickup portion from the semiconductor laser to the objective lens are accommodated in the actuator's movable portion which can be moved in the tracking direction and the focusing direction, it is possible to realize the small-sized and extremely light-weighted optical pickup portion, and it is also possible to realize the high-speed seeking operation.

Heretofore, the explanation is focused mainly on the optical pickup. However, the technical thoughts of the present invention can be applied also for the magneto-optic pickup. So, the present invention is not limited to the optical pickup only. Instead, it can be applied to both.

What is claimed is:

[1. An optical pickup apparatus comprising:

a light source;

an objective lens for focusing light ray flux emitted from said light source on an optical recording medium;

a quarter-wave plate located between said light source and said optical recording medium;

a flux separating element configured to separate light rays reflected on said optical recording medium from an optical axis of incident light rays, said flux separating element being formed of a birefringent material and disposed in a divergent optical path between said light source and said quarter-wave plate; and a light-receiving element positioned adjacent said light source and at a front side thereof for detecting a signal from said reflection light rays.]

[2. An optical pickup apparatus as defined in claim 1, wherein said light source is a semiconductor laser.]

[3. An optical pickup apparatus as defined in claim 1, wherein an incident plain surface of said flux separating element is not perpendicular to the optical axis.]

[4. An optical pickup apparatus as defined in claim 1, wherein said light source and said light-receiving element are unitarily constructed by combining both of them into one.]

[5. An optical pickup apparatus as defined in claim 1, wherein a plain plate made of birefringent material is employed as said flux separating element.]

[6. An optical pickup apparatus as defined in claim 1, wherein said flux separating element is employed as a window member of said semiconductor laser.]

[7. An optical pickup apparatus as defined in claim 1, wherein two pieces of prism consisting of same sort of uniaxial crystal respectively having optical axes intersecting perpendicularly to each other are employed as said flux separating element, such that when a refractive index for ordinary light rays of the prism $\eta_o$ is larger than a refractive index for extraordinary light rays $\eta_e$, an incident angle of the ordinary light rays transmitted through the first prism to the second prism is $\delta$, and a counterclockwise angle from the optical axis of the ordinary light rays is in a plus (+) direction when the value of $\delta$ becomes larger than zero, and such that when $\eta_o$ is larger than $\eta_e$, an incident angle of the extraordinary light rays transmitted through the first prism to the second prism is $\delta$, and a counterclockwise angle from the optical axis of the extraordinary light rays is in a plus (+) direction when the value of $\delta$ becomes smaller than zero ($\delta<0$).]

[8. An optical pickup apparatus as defined in claim 1, wherein said light source, said light-receiving element, said flux separating element, said quarter-wave plate and said objective lens are mounted unitarily to form a unitarily optical pickup portion.]

[9. An optical pickup apparatus as defined in claim 8, wherein said unitary optical pickup portion is accommodated in an actuator movable portion which can be moved both in a tracking direction and in a focusing direction.]

[10. An optical pickup apparatus as defined in claim 1, wherein said light source, said light-receiving element, said flux separating element, said quarter-wave plate and said objective lens are accommodated in an actuator movable portion which can be moved both in a tracking direction and in a focusing direction.]

[11. An optical pickup apparatus, comprising:

a semiconductor laser and at least one light-receiving element formed in a single stem and positioned such that said semiconductor laser emits light ray flux along a first optical path through an objective lens onto an optical recording medium in a form of a small spot to facilitate operation of recording, reproducing and/or erasing of optical information, and such that said at least one light-receiving element receives light from a second optical path that is at least partially different from said first optical path; and a uniaxial crystal plate having a discontinuous surface and being disposed in said first optical path between said semiconductor laser and the objective lens;

wherein said light ray flux emitted from said semiconductor laser is transmitted along said first optical path through said uniaxial crystal plate to said objective lens for focusing on the optical recording medium; and wherein light ray flux reflected from the optical recording medium is transmitted through said uniaxial crystal plate and along said second optical path to said at least one light-receiving element.]

[12. An optical pickup apparatus as defined in claim 11, wherein a uniaxial crystal plate is hermetically sealed unitarily in a package containing said semiconductor laser and said at least one light-receiving element therein.]

13. An optical pickup apparatus [as defined in claim 11], *comprising:*

*a semiconductor laser and at least one light-receiving element formed in a single stem and positioned such that said semiconductor laser emits light ray flux along a first optical path through an objective lens onto an optical recording medium in a form of a small spot to facilitate operation of recording, reproducing and/or erasing of optical information, and such that said at least one light-receiving element receives light from a second optical path that is at least partially different from said first optical path; and*

*a uniaxial crystal plate having a discontinuous surface and being disposed in said first optical path between said semiconductor laser and the objective lens;* wherein said at least one light-receiving element formed on said stem consists of two pieces of two-divisional light-receiving elements respectively having dividing directions different from each other, and a height of one of said light-receiving elements is the same as a height of said semiconductor laser, while a height of another one of said light-receiving elements is different from said height of said semiconductor laser.

14. An optical pickup apparatus as defined in claim [11] *13*, wherein [a] *the* uniaxial crystal plate is hermetically sealed unitarily in a package containing said semiconductor laser and said light-receiving element therein.

*15. An optical pickup apparatus as defined in claim 13, further comprising a collimator lens located between the uniaxial crystal plate and the optical recording medium.*

*16. An optical pickup apparatus as defined in claim 13, wherein an incident plain surface of the uniaxial crystal plate is not perpendicular to the optical axis.*

*17. An optical pickup apparatus as defined in claim 13, wherein the semiconductor laser, the light-receiving element, the uniaxial crystal plate and the objective lens are mounted unitarily to form a unitary optical pickup portion.*

*18. An optical pickup apparatus as defined in claim 17, wherein the unitary optical pickup portion is accommodated in an actuator movable portion which can be moved both in a tracking direction and in a focusing direction.*

*19. An optical pickup apparatus as defined in claim 13, wherein the semiconductor laser, the light-receiving element, the uniaxial crystal plate and the objective lens are accommodated in an actuator movable portion which can be moved both in a tracking direction and in a focusing direction.*

*20. An optical pickup apparatus as defined in claim 13, wherein the optical disc apparatus is an optical pickup.*

*21. An optical disc system comprising the optical disc apparatus as defined in claim 13.*

*22. An optical pickup apparatus comprising:*

*a light source;*

*an objective lens for focusing light ray flux emitted from the light source on an optical recording medium;*

*a quarter-wave plate located between the light source and the optical recording medium;*

*a flux separating element configured to separate light rays reflected on the optical recording medium from an opti-*

*cal axis of incident light rays, the flux separating element being disposed in a divergent optical path between the light source and the quarter-wave plate; and*

*a light-receiving element positioned adjacent the light source and at a front side thereof for detecting a signal from the reflection light rays, wherein the light source and the light-receiving element are formed in a single stem,*

*wherein two pieces of prism consisting of same sort of uniaxial crystal respectively having optical axes intersecting perpendicularly to each other are employed as the flux separating element, such that when a refractive index for ordinary light rays of the prism* $\eta_o$ *is larger than a refractive index for extraordinary light rays* $\eta_e$*, an incident angle of the ordinary light rays transmitted through the first prism to the second prism is* $\delta$*, and a counterclockwise angle from the optical axis of the ordinary light rays is in a plus* (+) *direction when the value of* $\delta$ *becomes larger than zero, and such that when* $\eta_o$ *is larger than* $\eta_e$*, an incident angle of the extraordinary light rays transmitted through the first prism to the second prism is* $\delta$*, and a counterclockwise angle from the optical axis of the extraordinary light rays is in a plus* (+) *direction when the value of* $\delta$ *becomes smaller than zero* ($\delta<0$).

*23. A method of directing incident light onto an optical recording medium and detecting reflected light therefrom, comprising:*

*emitting light flux from a light source along an emitting direction;*

*causing said light flux emitted from said light source in said emitting direction to travel along a first optical path through a uniaxial crystal plate to an objective lens in a form of a small spot to facilitate operation of recording, reproducing and/or erasing of optical information,*

*said uniaxial crystal plate having a discontinuous surface and being disposed in said first optical path between said light source and the objective lens;*

*causing light ray flux reflected from the optical recording medium to travel to at least one light-receiving element through said uniaxial crystal plate and along a second optical path that is at least partially different from said first optical path,*

*wherein said light source and said at least one light-receiving element are formed in a single stem, and*

*wherein said at least one light-receiving element formed on said stem consists of two pieces of two-divisional light-receiving elements respectively having dividing directions different from each other, and a height of one of said light-receiving elements is the same as a height of said light source, while a height of another one of said light-receiving elements is different from said height of said light source.*

* * * * *